(12) United States Patent
Nance

(10) Patent No.: US 9,045,237 B2
(45) Date of Patent: *Jun. 2, 2015

(54) AUTOMATED INSPECTION OF AIRCRAFT LANDING GEAR INTERNAL FLUID LEVELS

(71) Applicant: C. Kirk Nance, Keller, TX (US)

(72) Inventor: C. Kirk Nance, Keller, TX (US)

( * ) Notice: Subject to any disclaimer, the term of this patent is extended or adjusted under 35 U.S.C. 154(b) by 64 days.

This patent is subject to a terminal disclaimer.

(21) Appl. No.: 14/058,600

(22) Filed: Oct. 21, 2013

(65) Prior Publication Data

US 2014/0046533 A1    Feb. 13, 2014

Related U.S. Application Data

(63) Continuation-in-part of application No. 13/221,250, filed on Aug. 30, 2011, now Pat. No. 8,565,968.

(60) Provisional application No. 61/378,598, filed on Aug. 31, 2010.

(51) Int. Cl.
*G01M 3/00* (2006.01)
*B64F 5/00* (2006.01)
*G01M 17/04* (2006.01)

(52) U.S. Cl.
CPC ............. *B64F 5/0045* (2013.01); *G01M 17/04* (2013.01)

(58) Field of Classification Search
USPC ................... 705/5, 16, 124; 73/65.05; 244/63, 244/100 R, 102 A, 102 FP, 102 R, 104 FP; 267/64.22, 64.26; 446/57; 340/960
See application file for complete search history.

(56) References Cited

U.S. PATENT DOCUMENTS

| 1,888,578 | A | * | 11/1932 | Wallace | 267/64.26 |
|---|---|---|---|---|---|
| 1,918,698 | A | * | 7/1933 | Gruss | 267/64.26 |
| 2,276,466 | A | * | 3/1942 | Cleveland | 244/104 FP |
| 2,423,736 | A | * | 7/1947 | Tack | 267/64.22 |
| 3,393,883 | A | * | 7/1968 | Smith et al. | 244/102 R |
| 4,092,947 | A | | 6/1978 | Labrecque | |
| 4,524,929 | A | * | 6/1985 | Gebhard | 244/63 |
| 4,687,158 | A | * | 8/1987 | Kettering | 244/63 |
| 5,078,638 | A | * | 1/1992 | Molina | 446/57 |
| 5,214,586 | A | * | 5/1993 | Nance | 701/124 |
| 5,548,517 | A | * | 8/1996 | Nance | 701/124 |

(Continued)

OTHER PUBLICATIONS

Patent Cooperation Treaty (PCT) International Search Report and Written Opinion of the International Searching Authority, Application No. PCT/US2011/049819 filed Aug. 31, 2011, Inventor C. Kirk Nance, 6 pages.

*Primary Examiner* — James Trammell
*Assistant Examiner* — Sanjeev Malhotra
(74) *Attorney, Agent, or Firm* — Geoffrey A. Mantooth

(57) ABSTRACT

A system for use in monitoring, measuring, computing and displaying the volumes of internal gas within a telescopic aircraft landing gear strut. Pressure sensors and temperature sensors and motion sensors are mounted in relation to each of the landing gear struts to monitor, measure and record the impact movement and rates of internal landing gear strut fluids; experienced by landing gear struts, as the aircraft landing gear initially come into contact with the ground. The computer of this system measures the compression experienced by each landing gear strut and determines if the landing gear strut is improperly serviced with either excess or deficient volumes of nitrogen gas. Additional features include automating the inspections required to aircraft landing gear, prior to flight, during flight and during landing events.

11 Claims, 12 Drawing Sheets

(56) References Cited

U.S. PATENT DOCUMENTS

| | | |
|---|---|---|
| 6,128,951 A | 10/2000 | Nance |
| 6,193,190 B1 | 2/2001 | Nance |
| 6,237,406 B1 | 5/2001 | Nance |
| 6,237,407 B1 | 5/2001 | Nance |
| 6,293,141 B1 | 9/2001 | Nance |
| 7,193,530 B2 | 3/2007 | Nance |
| 7,274,309 B2 | 9/2007 | Nance |
| 7,274,310 B1 | 9/2007 | Nance |
| 8,180,504 B1 * | 5/2012 | Nance ................. 701/5 |
| 2004/0129834 A1 * | 7/2004 | Luce .................. 244/100 R |
| 2006/0144997 A1 | 7/2006 | Schmidt et al. |
| 2006/0220917 A1 * | 10/2006 | Nance ................. 340/960 |
| 2007/0069072 A1 * | 3/2007 | Luce .................. 244/104 FP |
| 2007/0221783 A1 * | 9/2007 | Parks et al. ............ 244/102 A |
| 2009/0064769 A1 * | 3/2009 | Davis et al. ............ 73/65.05 |
| 2009/0321560 A1 * | 12/2009 | Luce et al. ............ 244/102 R |
| 2010/0017052 A1 * | 1/2010 | Luce ................. 701/16 |
| 2010/0084509 A1 * | 4/2010 | Weaver et al. ......... 244/102 R |
| 2010/0133379 A1 * | 6/2010 | DeVlieg ............ 244/104 FP |

\* cited by examiner

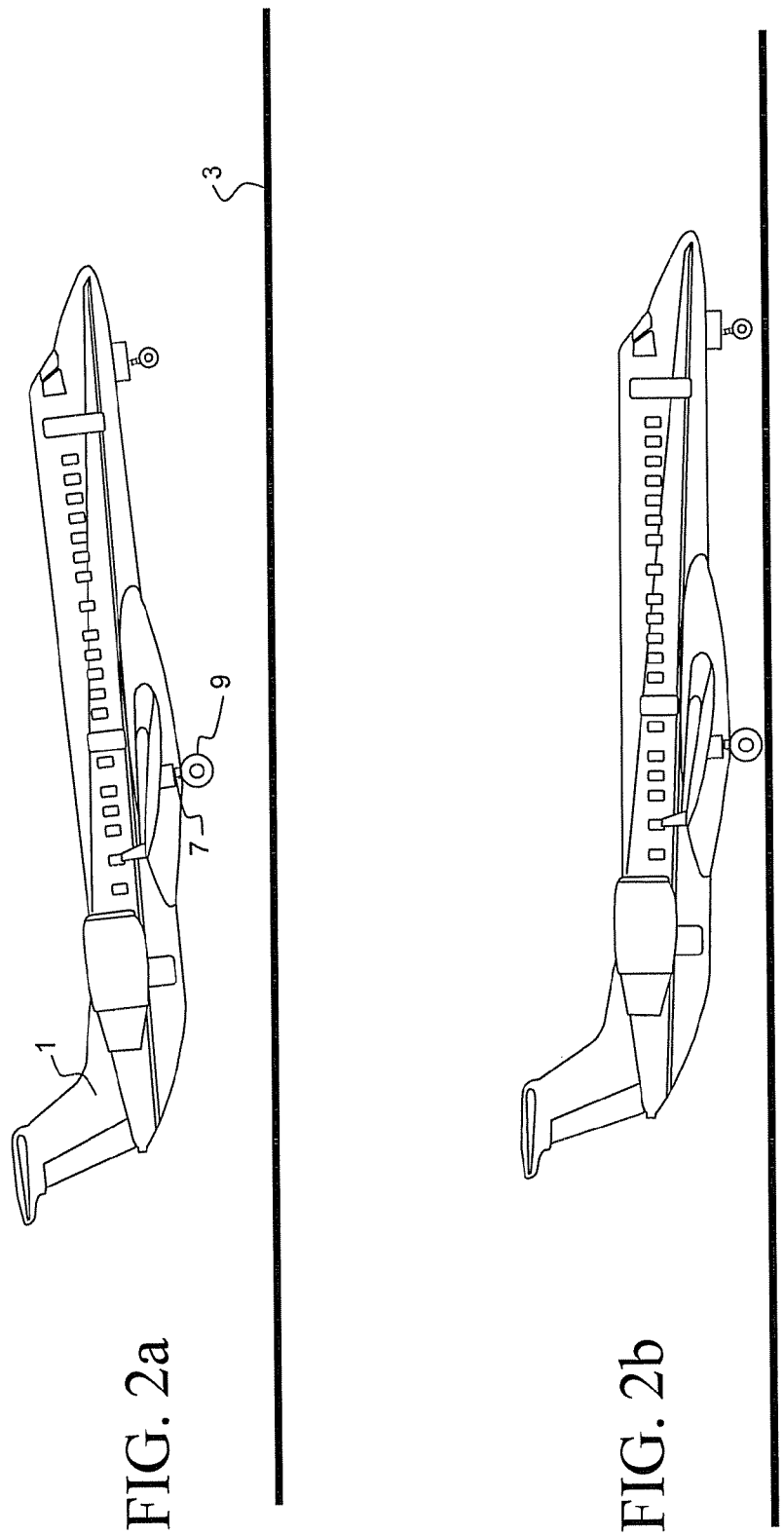

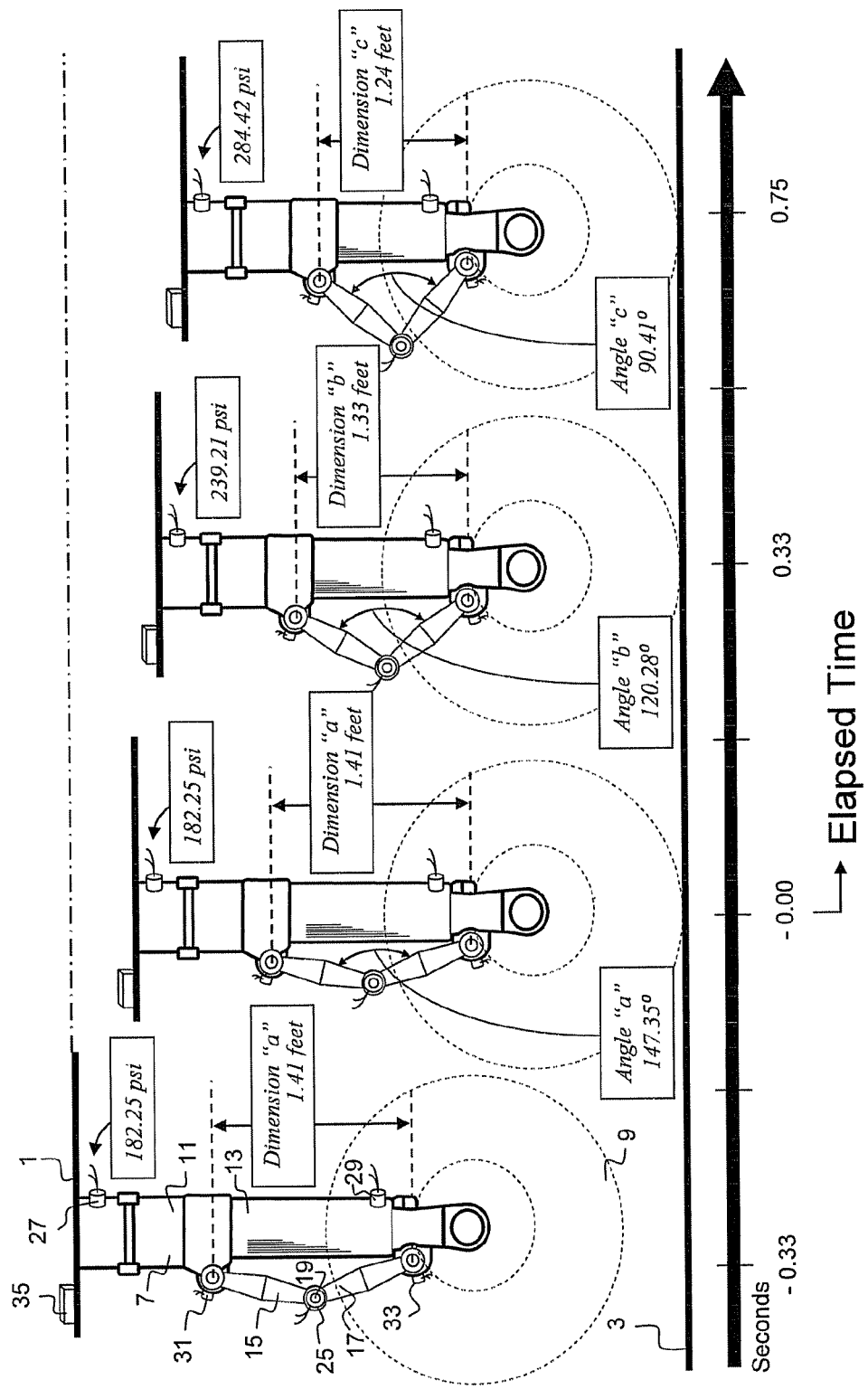

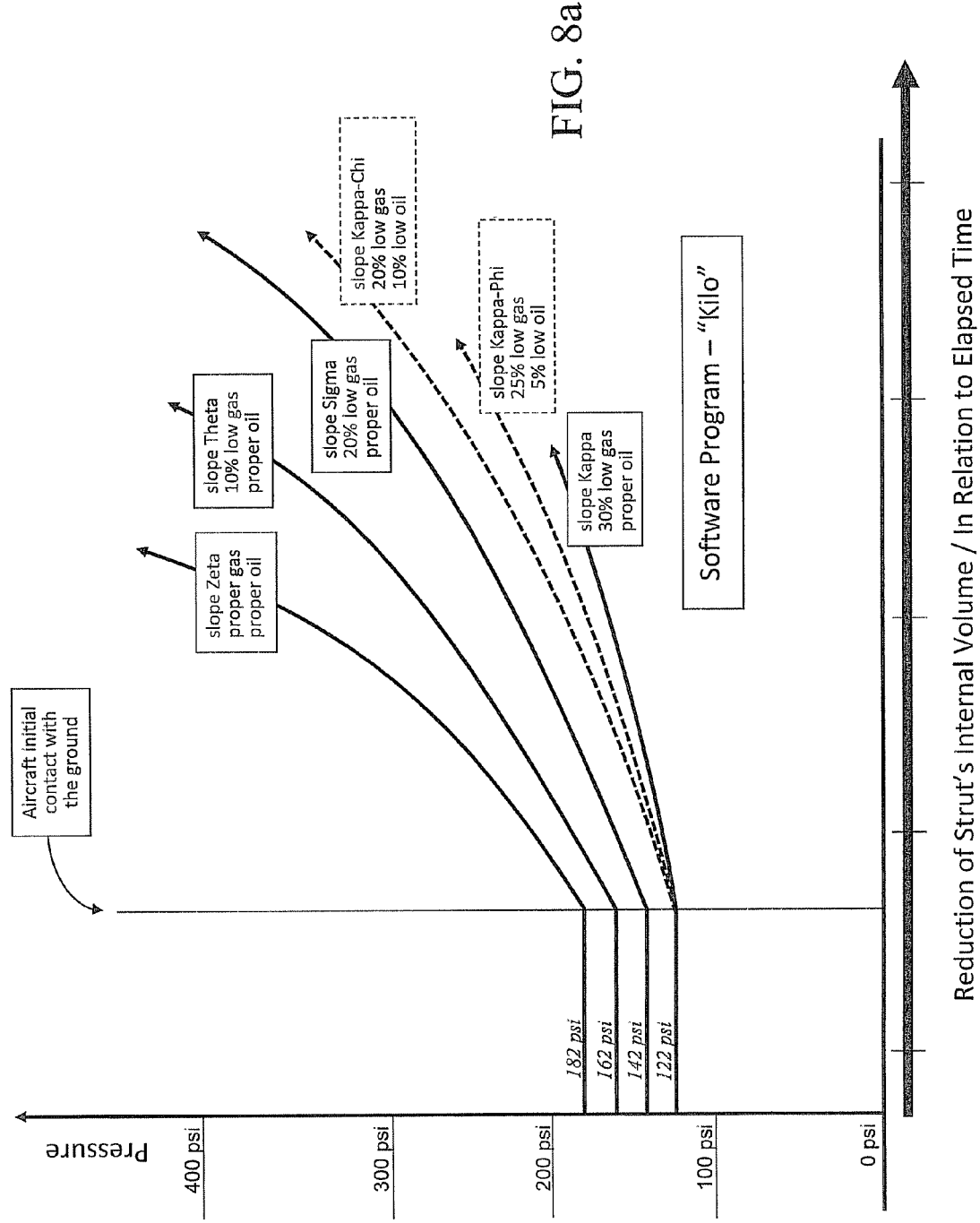

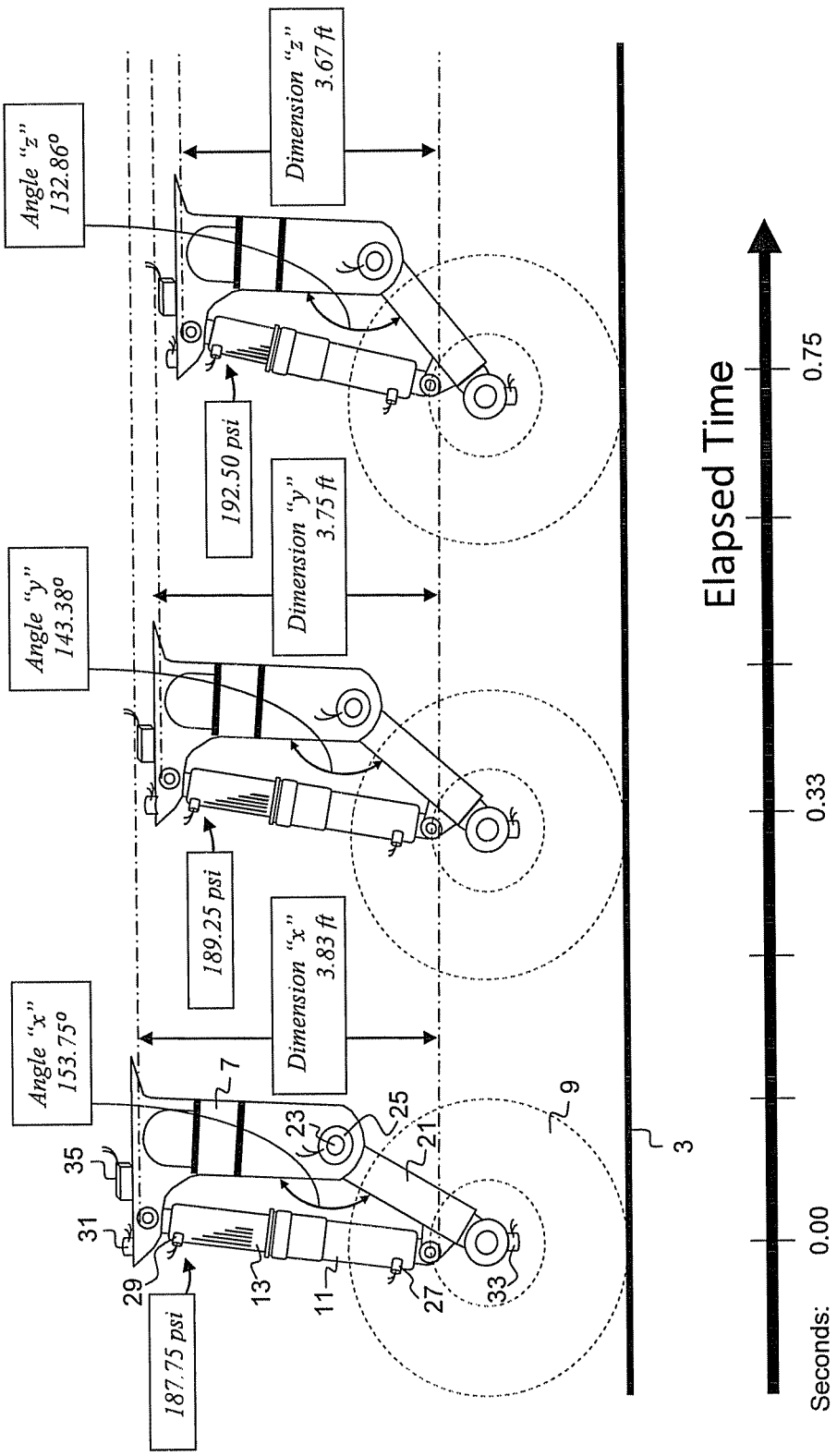

AUTOMATED INSPECTION OF AIRCRAFT LANDING GEAR INTERNAL FLUID LEVELS

This application is a continuation-in-part application of Ser. No. 13/221,250, filed Aug. 30, 2011, which in turn claims the benefit of U.S. patent application Ser. No. 61/378,598, filed Aug. 31, 2010.

BACKGROUND OF THE INVENTION

Typical aircraft used in day-to-day airline operations are commonly supported by a plurality of compressible landing gear struts. These landing gear struts contain pressurized hydraulic fluid and nitrogen gas. Aircraft landing gear struts incorporate a shock absorbing technique of forcing hydraulic fluid through an internal orifice-hole within a compressible/telescopic strut. As the aircraft lands and the strut compresses, the internal volume within the strut is reduced. This reduction of strut volume causes the contained nitrogen gas pressure to increase. The hydraulic oil which is also contained within the strut is a non-compressible fluid. This pressure increase of the nitrogen gas is explained by Boyle's Law, named after the chemist and physicist Robert Boyle, who published the original law in 1662. Boyle's Law describes the inversely proportional relationship between the absolute pressure and volume of a gas, within a closed system.

There are many critical factors the pilot of an aircraft must consider, when determining if that aircraft is safe for landing. One of those is the "proper fluid servicing levels" within the landing gear strut. "Proper fluid servicing levels" can be described as the proper volumes of both the hydraulic oil and nitrogen gas, within the compressible, telescopic landing gear strut. Aircraft manufacturers determine, certify and publish the minimum volume limitations for proper strut servicing levels, for respective aircraft landing gear struts. Properly serviced landing gear insure that during each aircraft landing event, the aircraft landing gear shock strut's gas and fluid levels are sufficient to absorb the energy of the airplane's transition from descending flight, through the landing impact, and to a smooth roll-out along the airport runway.

Typically landing gear struts are serviced by the following procedure. While the aircraft is inside a hanger and completely lifted up off of the ground, by jacks; the landing gear are suspended below the aircraft wing or fuselage, thus support no weight. In this suspended position the telescopic aircraft landing gear struts will extend to their full telescopic limits. Lifting all of the aircraft weight off of the landing gear reduces the internal pressure within the landing gear strut to a minimal amount, commonly called the "pre-charge pressure." That pre-charge pressure is then released through a nitrogen gas servicing valve, often called a Schrader valve. Once all of the internal pressure has been released, a secondary jack is placed beneath the landing gear strut in a position as to allow that jack to lift the landing gear strut thus collapsing the telescopic piston of the landing gear and compress the de-charged strut to its minimum extension position. Once in this position, hydraulic oil will be added to the strut (through the Schrader valve or some other fill-port) until such time as all volume within the totally collapsed strut if full of oil. The Schrader valve will then be closed and the jack will be removed from beneath the collapsed landing gear strut. At this point, a compressed nitrogen gas bottle will be attached to the closed Schrader valve and the Schrader valve will be re-opened. Compressed nitrogen gas will then be forced into the strut until such time as the internal strut pressure reaches the manufacturer's design "pre-charge pressure" (as an example and in this case the pre-charge pressure is 182.25 psi). The introduction of compressed nitrogen gas to the strut will force the collapsed strut to extend, and the telescopic strut will extend to its full telescopic limit. The aircraft will then be removed from the jacks which were supporting the entire aircraft. As the aircraft is removed from the jacks, the weight of the aircraft is transferred onto the landing gear struts. The landing gear strut will compress until it reaches a point of equilibrium where the internal strut pressure is sufficient to support the aircraft. With a tricycle design aircraft, the aircraft rest on three pockets of compressed nitrogen gas. Once the aircraft is resting on the hanger floor, the landing gear strut will have an extension amount where about four inches of the chrome telescopic piston is apparent. This is what most pilots call the "four inches of shiny" which they typically look for, and feel comfortable with, as they conclude the pre-flight walk-around aircraft inspection.

Airline Maintenance Operation Departments have the responsibility of insuring these landing gear struts are properly serviced, and are often divided into two separate divisions. These two divisions being: "Line Maintenance Operations" with the responsibility for minor maintenance procedures that may arise while the aircraft is located at the airport gate, just prior to departure; and the traditional "Maintenance Department" with the responsibility of more extensive maintenance activities, and regularly scheduled maintenance task and procedures accomplished within an aircraft hangar; during such times as the aircraft is removed from scheduled operations.

One issue for consideration, regarding this invention, often arises with the Line Operation Maintenance, while the aircraft is awaiting departure from the airport gate. As an example . . . Prior to departing the airport gate the co-pilot will perform an aircraft pre-flight inspection walk-around. During this walk-around he may notice one of the main landing gear struts has a posture where the strut appears to be collapsed/compressed more than would be typically acceptable (the pilot not seeing the 4" of shiny chrome), especially when comparing it to the opposing main landing gear of that same aircraft. The co-pilot will report that strut as being low, to the Line Operations Maintenance Department and a service technician will be sent to investigate the strut. In most cases that Line Operations Maintenance technician will make an assessment, and conclude that the landing gear has lost nitrogen gas. The technician will then add additional nitrogen gas to that strut, until such time as the strut extends to a posture that appears correct. The typical "four inches of shiny" which pilots typically look for. The problem with this practice is that the nitrogen gas which is added to the strut is often replacing hydraulic oil which has leaked through the landing gear strut seals. The repetition of this procedure, on that same landing gear, over a period of several weeks can allow for a significant amount of non-compressible hydraulic fluid to be lost from that strut, and mistakenly replaced with compressible nitrogen gas. This will cause that strut to be less effective for landing. A landing gear with an insufficient amount of hydraulic fluid and an excess amount of nitrogen gas would have the initial compression of that landing gear, during the landing event, forcing nitrogen gas through the landing gear strut's internal orifice, instead of hydraulic oil; thus reducing the shock absorbing effectiveness of the landing gear strut.

This new invention describes two methods of determining if the proper volumes of both hydraulic oil and a third method of determining the lost volume of nitrogen gas from the landing gear strut. Where in the event described above, nitrogen gas was injected into a landing gear strut which had lost hydraulic oil . . . considering the aircraft is not suspended by jacks, the internal strut pressure is supporting the weight of the aircraft and the strut will maintain a high pressure. The only option for the maintenance technician is to inject enough volume of highly compressed nitrogen gas into the strut, until such time as the strut reveals the "four inches of shiny" which the pilot is looking for. This is the easiest and fastest way to insure the aircraft is not delayed from its scheduled departure.

Once the aircraft is airborne and no weight is being applied to the strut, the strut will extend to its full telescopic limit. With the strut now being over-serviced with an excess amount of compressible nitrogen gas, as opposed to a proper volume of non-compressible hydraulic fluid; the strut pre-charge pressure will be higher than what would be normally evident with a properly serviced strut.

Landing gear strut temperatures can vary widely from extreme low temperatures of a cold-soaked strut which has been flying at high altitude for 3-4 hours and kept at temperatures of −40° to times when the same landing gear is extended from within the aircraft wing and exposed to tropical climates and having winds as high as at 200 knots, passing across the landing gear generating friction and heating up the landing gear components. A pressure sensor which is temperature compensated can be used to help adjust strut pressure measurements for any errors caused by variable temperatures.

An alternative means of determining both nitrogen gas volume and hydraulic oil volume, is to use the aircraft landing event with the compression of the landing gear strut to force changes in internal strut volume, at the same time monitoring strut pressure changes, and compare both pressure and volume changes in relation to the passing of Elapsed Time.

Research of the prior art to determine aircraft landing gear strut servicing levels are documented and reference may be made to U.S. Pat. No. 4,092,947 Labrecque, U.S. Pat. No. 6,128,951 Nance and US Patent Application Publication US 2007/0069072 A1, Luce.

The prior art described by Labrecque explains of a mechanical apparatus added to the landing gear strut which incorporates a sliding rod which will rupture a disc at a selected position, to expose a low oil level indicator. This design differs from that of the present invention, as it is a mechanical device, utilizing no computer logic in its method.

The new art of this invention relates to improvements to the prior art of this inventor (Nance) U.S. Pat. No. 6,128,951. The prior art described by Nance, among other things, measures strut pressure within each landing gear strut, as well as the pressure distortions caused by strut seal friction. The prior art of Nance incorporate methods of using apparatus added to the aircraft which mechanically and physically changing the volume of fluid within the landing gear strut, while the aircraft is on the ground and at rest; while monitoring pressure changes in relation to pressure increases to a point where strut seal friction is overcome. As fluid volume within the strut is changed to induce strut movement, determining strut movement which has taken a longer period of time can be used to determine an excess in compressible gas within the strut.

The prior art described by Luce explains of a method of inserting flexible optical probes, through an external access port of the landing gear, to travel inside the mechanism of the telescopic landing gear strut, which visually identifies oil level within the strut. The art described by Luce application could be best utilized with aircraft landing gear designs of the future, due to the requirement to re-certify existing landing gear design to allow for the internal introduction of what would be a possible source of mechanism interference to the telescopic movement of the strut.

The art described within this current application is applicable as an uncomplicated re-fit to the existing landing gear designs, for the 44,000+ civilian aircraft and 27,000+ military aircraft currently in operation around the world today.

The new art described in this invention eliminates the need for apparatus to induce strut movement, or add complicated elements to be embedded within the landing gear mechanism, but instead collects pressure, temperature and movement data from external locations and servicing ports of the landing gear strut during an aircraft landing event. Strut pressure increases, compensated for changes in the strut's internal temperature, are monitored during the compression of the strut, in relation to Elapsed Time; and compared to previously stored data taken from a strut which was properly serviced. A properly serviced strut (which is now landing) will have the same "pressure-to-volume-to-Elapsed Time" profile as that of the pressure profile of a properly serviced strut which has been stored within the memory of the system. Any difference in the pressure profile will be detected and evaluated to determine the amount of gas-to-oil imbalance which has caused the pressure profile to be different from that of a properly serviced strut.

SUMMARY OF THE INVENTION

It is one object of the present invention to provide improvements to this inventor's previous system for the monitoring of landing gear strut fluid levels (U.S. Pat. No. 6,128,951), which utilizes landing gear strut pressure monitoring.

It is another object of the present invention to provide a means to reduce the complexity of a system which measures and determines aircraft landing gear strut fluid volumes.

It is another object of the present invention to provide a tool to automatically measure landing gear strut fluid levels, during each landing event.

It is another object of the present invention to provide a tool to compile a data history for each landing gear strut to be used to evaluate potential landing gear strut seal leakage.

It is another objective of the present invention to provide a means to measure landing gear internal strut pressure, while the aircraft is in flight.

Still another object of the present invention is to provide a method for monitoring a landing gear strut of an aircraft, during a landing event. The landing gear strut is telescopic and comprises a compressible gas and a non-compressible fluid. The telescopic rate of movement of the strut is determined during a landing event. A determination is made if the strut pressure increases (which are directly related to internal strut volume) as related to Elapsed Time; and has exceeded a predetermined strut rate of movement. If the Elapsed Time required for strut pressure increases, as compared to strut volume reductions exceeded the predetermined rate of movement, then an indication of an excess amount of nitrogen gas is provided.

It is another object of the present invention to provide a tool which measures landing gear strut pressure, compensated for temperature variations, prior to each landing event, to identify potentially higher internal strut pre-charge pressure; which would identify a strut which is has a deficient amount of hydraulic oil and an excess amount of nitrogen gas.

It is another object of the present invention to provide a tool to measure landing gear strut pressure during each landing event, to further measure landing gear rate of compression during each landing event, thus measuring internal strut volume; to measure a deficient amount of hydraulic oil and an excess amount of nitrogen gas.

There is provided a method of monitoring internal fluid levels in a landing gear on an aircraft, the landing gear comprising a telescopic strut, the internal fluids comprising a compressible fluid and a non-compressible fluid, which telescopic strut is capable of extension. The method allows the strut to fully extend under no load while the aircraft is in flight. A temperature-compensated pressure of the fluids in the struts is determined. Comparing the temperature compensated pressure of the fluids in the struts, as compared to a predetermined pressure of a properly serviced strut. Determining from the pressure the respective amounts of compressible and non-compressible fluid in the strut.

In accordance with one aspect, providing a look up table of pressures and corresponding ratio amounts of compressible and non-compressible fluid in the strut. The step of determining from the pressure the respective amounts of compressible and non-compressible fluid in the strut further comprising the step of using the look up table.

In accordance with another aspect, the step of allowing the strut to fully extend under no load further comprises the step of allowing the strut to extend after takeoff of the aircraft from the ground.

In accordance with another aspect, the step of allowing the strut to fully extend under no load further comprises the step of allowing the strut to extend before landing the aircraft on the ground.

In accordance with another aspect, the compressible fluid comprises nitrogen gas and the non-compressible fluid comprises oil.

In accordance with another aspect, the step of determining from the pressure the respective amounts of compressible and non-compressible fluids in the strut further comprises the step of comparing the pressure to a predetermined threshold. If the pressure exceeds the threshold, then providing an indication of low non-compressible fluid.

In accordance with another aspect, further comprising the step of recording the amount of compressible and non-compressible fluid in the strut.

There is also a method of monitoring internal fluid levels in a landing gear on an aircraft, the landing gear comprising a telescopic strut, the internal fluids comprising a compressible fluid and a non-compressible fluid, which telescopic strut is capable of extension. Exercising the strut while the aircraft is transporting passengers or cargo. While the strut is exercised, allowing the strut to extend fully. Determining a pressure of the fluids in the strut over elapsed time. Determining from the pressure the respective amounts of compressible and non-compressible fluid in the strut.

In accordance with another aspect, wherein the step of determining from the pressure the amounts of compressible and non-compressible fluid in the strut further comprises the step of determining the amounts of compressible and non-compressible fluid from the rate of change in pressure over elapsed time.

In accordance with another aspect, wherein the step of exercising the strut while the aircraft is transporting passengers or cargo further comprises the step of exercising the strut while the aircraft is landing.

In accordance with another aspect, wherein the step of exercising the strut while the aircraft is transporting passengers or cargo further comprises the step of exercising the strut while the aircraft is taking off.

In accordance with another aspect, further comprising the step of recording the respective amounts of compressible and non-compressible fluids in the strut.

BRIEF DESCRIPTION OF THE DRAWINGS

Although the features of this invention, which are considered to be novel, are expressed in the appended claims; further details as to preferred practices and as to the further objects and features thereof may be most readily comprehended through reference to the following description when taken in connection with the accompanying drawings, wherein:

FIGS. 2a, 2b are views of a typical regional aircraft as it approaches for landing, and then as it makes initial ground contact of the landing event.

FIGS. 3a, 3b, 3c, 3d show a series of side views of the telescopic elements of a typical aircraft landing gear strut:
prior to coming into contact with the ground;
coming into initial contact with the ground;
as the landing gear compresses during the landing event;
as compared to Elapsed Time.

FIGS. 5b, 5c, 5d relate respectively to FIGS. 3b, 3c and 3d and show a series of cross-sectional views of the internal elements of a typical telescopic aircraft landing gear strut (with prom gas and fluid volumes), as it compresses during the initial stages of a landing event; as compared to Elapsed Time. There is no FIG. 5a.

FIGS. 6b, 6c, 6d relate respectively to FIGS. 3b, 3c and 3d and show a series of cross-sectional views of the internal elements of a typical telescopic aircraft landing gear strut (with excess gas volumes and deficient oil volumes), as it compresses during the initial stages of a landing event; as compared to Elapsed Time. There is no FIG. 6a.

FIG. 8a is an illustration of Software Program "Kilo" which monitors landing gear strut volume changes, in relation to pressure changes, during aircraft landing events, and compares measured data against previously stored data, to determine gas volumes within the landing gear strut.

FIGS. 9b, 9c, 9d show a series of side views of the rotating and compressing elements of an alternate design "trailing arm type" aircraft landing gear strut, as it compresses during the initial stages of a landing event; as compared to Elapsed Time.

DETAILED DESCRIPTION OF THE PREFERRED EMBODIMENT

Figure 1:
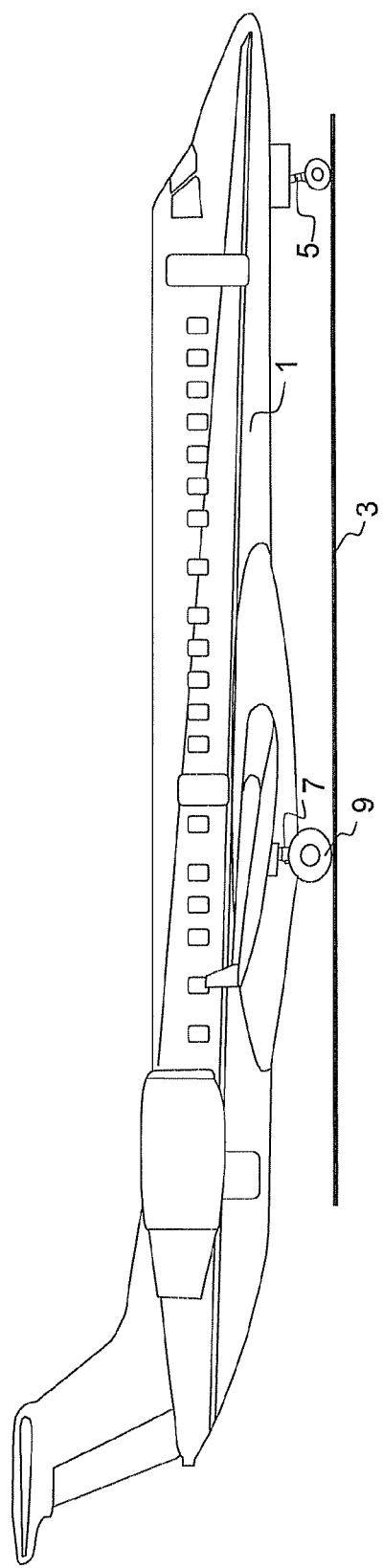
FIG. 1 is a view of a typical regional aircraft with a tricycle type landing gear, in the extended position, resting on the ground.

An aircraft is typically supported by plural pressurized landing gear struts. In many if not most cases, aircraft are supported by three landing gear struts. Each landing gear strut is designed much like, and incorporates many of the features of a typical shock absorber. The shock absorber of the landing gear strut comprises internal fluids, of both hydraulic oil and compressed nitrogen gas. More simply said ... "the weight of an aircraft rests on three pockets of compressed nitrogen gas." The aircraft weight is transferred to and/or identified by the pressures contained within the landing gear struts. Weight is proportional to pressure measured in "psi" (pounds per square inch).

Aircraft landing gear struts are kept at some level of pressure, whether that pressure be from the extreme pressure of an aircraft hard landing event, the weight of the aircraft supported by the landing gear while resting on the ground, or the landing gear strut pre-charge pressure, Landing gear strut pre-charge pressure is the minimum pressure maintained in the struts while the aircraft is flying. The pre-charge pressure is maintained to insure the telescopic landing gear strut is at full extension when the landing gear are deployed for an aircraft landing. Insuring the landing gear are at full extension, allows the landing gear to absorb the maximum amount of landing energy and loads. Having the landing gear continuously under pressure increases the chance that the strut can leak either gas or oil. There are no systems available for today's non-military, commercial aircraft that can determine when a landing gear strut is low on oil. With no system to monitor oil levels, aircraft maintenance programs have procedures to verify proper oil and gas ratios within the landing gear strut. Typical landing gear strut servicing procedures are as follows:

1) The aircraft is moved into a hanger and raised by jacks, until all landing gear are suspended above the floor.
2) Strut pressure is released through a Schrader valve.
3) With no contained pressure within the strut, a small auxiliary jack is placed directly below the telescopic landing gear and the strut is jacked to the point of being fully compressed.
4) With the strut fully compressed, oil is pumped into the strut until the volume of the fully collapsed strut is full of oil.
5) With the compressed strut now full of oil, the Schrader valve will be closed and the jack removed from beneath the compressed strut.
6) Pressurized nitrogen gas will be injected into the strut, forcing the strut to extend to its full telescopic limit, until the strut reaches its recommended pre-charge pressure (in this example the landing gear strut pre-charge pressure is 182.25 psi).
7) The aircraft will then be lowered off the jacks and the internal strut pressure will increase to an amount proportional to the weight supported by each respective landing gear strut. With a properly serviced landing gear strut, with the weight of the aircraft supported, there should be 4" of exposed chrome on the strut piston.

As the aircraft is introduce back into service, each time the aircraft takes off the strut will extend to full extension and strut pressure will reduce to the pre-charge pressure of 182.25 psi. That pre-charge pressure value is stored within a look-up table with the computer of this invention. If during a pre-flight inspection the strut is found not to have 4" of exposed shiny chrome, but instead 2" of exposed chrome; a maintenance technician will be summoned to correct the problem. Typically the maintenance technician will inject compressed nitrogen gas into the strut, until the amount of exposed chrome returns to 4 inches. The problem with the practice is that the strut has lost either oil or gas or both, but no one knows for sure.

The present invention can perform an automated inspection of the amounts of both hydraulic oil and nitrogen gas, contained within the landing gear shock strut, by monitoring aircraft landing gear strut pre-charge pressure and comparing each subsequent post take-off pre-charge pressure, to that of a properly serviced landing gear strut.

When a non-compressible oil has leaked from the landing gear strut (as an example: oil volume has leaked from the strut in an amount equivalent to 2" of exposed strut piston chrome, with the aircraft weight supported by each respective strut) and that same volume is mistakenly replaced with a highly pressurized compressible gas; the next time the aircraft takes-off, the landing gear strut pre-charge pressure will be higher, in proportion to the number of ounces of oil which has leaked from the landing gear strut.

An alternate means to measure landing gear strut fluid volumes include strut pressures being monitored dynamically, during each landing event, so as to measure pressure increases and strut volume reductions. Such dynamic measurement provides more accurate information on the relative amounts of oil and gas. The dynamic measurement monitors the amount of pressure changes and the rate of pressure changes, of the fluids within each of the landing gear struts, along with the rate of internal volume reduction and the amount of internal volume reduction, caused by the compression of each respective landing gear strut, so as to determine if landing gear strut fluids are at proper amounts. These pressure changes are caused by compression of the landing gear struts, during the landing of the aircraft. Struts can be monitored while the aircraft is in operation, transporting passengers and/or cargo. The aircraft need not be taken out of service.

Compression of the landing gear strut is detected in two separate ways:

1) pressure increases—are monitored and measured within the landing gear shock absorber by pressure sensors that monitor the internal working pressure within the telescopic elements of the landing gear strut;
2) strut movement—[be it telescopic or hinged movement] of the landing gear is measured by rotation sensors located on rotating elements of telescopic elements of the landing gear strut.

Upon detection of the compression of a respective landing gear strut, the step of monitoring the rate of strut compression and the amount of strut compression is used to determine the amount of oil as compared to the amount of gas within the strut. The pressure within each of the landing gear struts is determined during this same period of time. These pressure determinations along with the amount of reduced total volume within the landing gear strut measured during a landing event are used to identify a strut pressure-increase profile. This strut pressure-increase profile is compared to that of the strut pressure-increase profile of a properly serviced landing gear strut, which has been previously recorded and stored in memory. Any deviation in the current pressure profile, to that of the proper profile, stored within the system's memory, is used to determine the respective volumes of hydraulic oil and nitrogen gas, contained within the landing gear strut. Once these calculations have been made and recorded, they are compared to the manufacturer's recommended fluid volumes.

Referring now to the drawings, wherein like reference numerals designate corresponding parts throughout the several views and more particularly to FIG. 1 thereof, there is shown a typical regional aircraft 1, with tricycle landing gear configuration consisting of a nose landing gear 5, and shown one of the two identical main landing gears 7. Landing gear 7 incorporate tire 9 to distribute the weight of aircraft which is resting on the ground 3. The use of regional aircraft is by way of example, as the apparatus and methods described herein can be used on all types of aircraft.

Referring now to FIG. 2a, there is shown a typical regional aircraft 1 just prior to landing.

Referring now to FIG. 2b, there is shown a typical regional aircraft 1 with tires 9 of main landing gear 7 making initial contact with the ground 3.

Figure 2C:
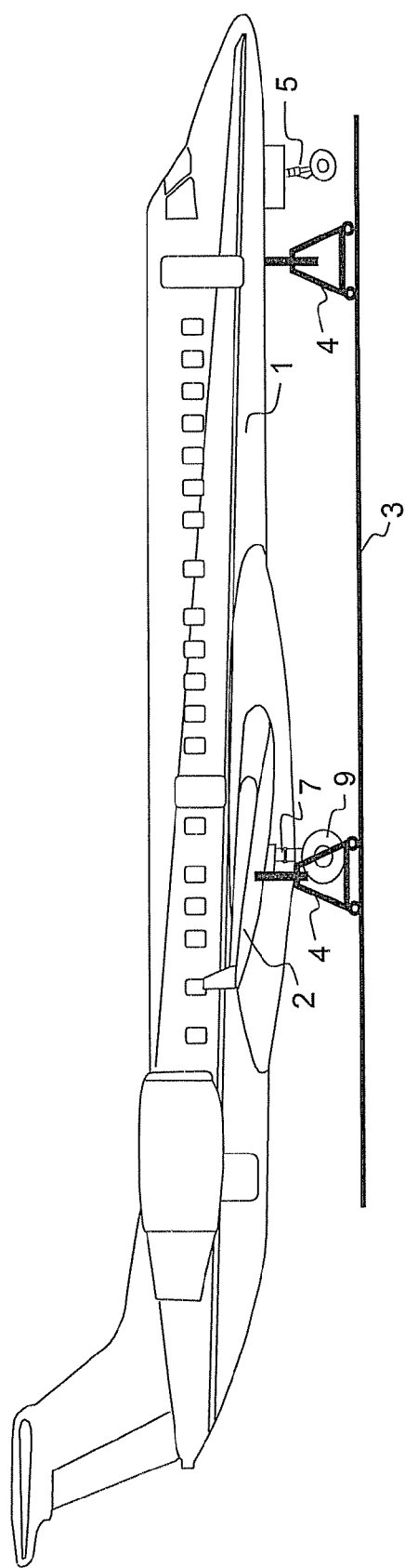
FIG. 2c is a view of a typical regional aircraft with a tricycle type landing gear, in the extended position, lifted on aircraft jacks and suspended above the ground

Referring now to FIG. 2c, there is shown a typical regional aircraft 1 lifted above the ground 3 supported by plural aircraft jacks 4. Main landing gear 7 and nose landing gear 5 reach full telescopic extension while the aircraft 1 is in flight. The flight of aircraft 1 can be simulated by raising aircraft 1 above and off the ground 3 with the use of plural aircraft jacks 4 lifting the aircraft frame and allowing the landing gear to fully extend. To insure proper balance of aircraft 1 throughout the lifting process, aircraft 1 is lifted by a minimum of three aircraft jacks 4 (where a third jack 4 is used, but not shown).

Figure 10:
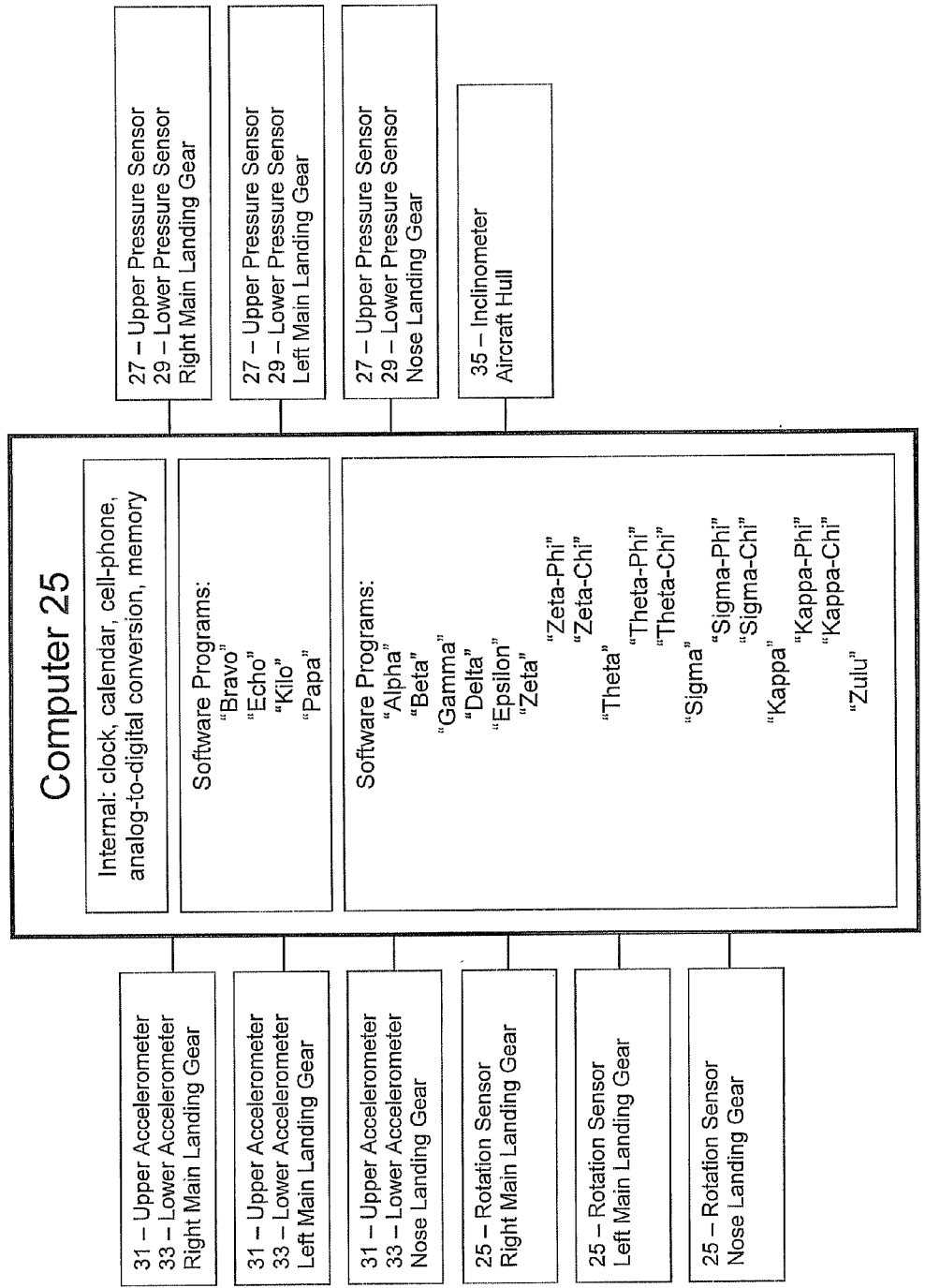
FIG. 10 is a schematic diagram of the onboard computer, sensor inputs and software programs of the invention.

Referring now to FIG. 3a, there is shown an example of a typical main landing gear 7 (as shown in FIG. 1) with tire 9 located slightly above and just prior to making initial contact with the ground 3. Illustrated across the bottom through FIGS. 3a, 3b, 3c and 3d is an arrow extending from left to right. This arrow represents ELAPSED TIME. ELAPSED TIME is monitored by an internal clock, located within the system's computer 25 (as shown in FIG. 10). The vertical lines on the arrow divide ELAPSED TIME into various increments of $1/1000^{th}$ of a second. ELAPSED TIME begins prior to the initial contact of tire 9 with the ground 3, and extends for a period of time which is after initial contact with the ground, with a total period of less than one second. Prior to the initial contact with the ground, ELAPSED TIME is illustrated in negative numbers, counting down to initial contact with the ground.

Figure 4:
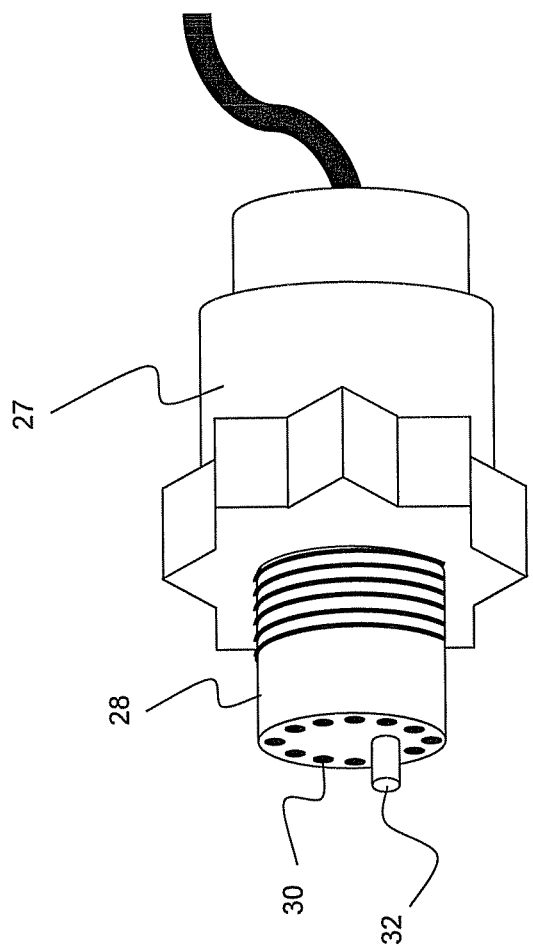
FIG. 4 is a view of a typical pressure sensor, with an integral temperature sensor.

Main landing gear 7 consists of an oleo-type shock strut cylinder 11 including a telescopic piston 13, where together they shall hereafter be referred to as the "strut 7" of which absorbs the landing loads of the airplane. It is important that the alignment of piston 13 stay constant with the aircraft 1 and does not rotate within cylinder 11. Rotation of cylinder 13 is prevented by a mechanism commonly known as a torque-link (sometimes referred to as a "scissor-link"). The torque-link has an upper arm 15 connected to a lower arm 17, adjoined to each other by a rotating hinge 19. During an aircraft landing event, as strut 7 compresses with the telescopic withdrawal of piston 13 into cylinder 11; the size of the angle created at hinge 19 will decrease. The monitoring of the changing angles of hinge 19 is measured with a rotation sensor 25. Rotation sensor 25 has the ability to measure changes in angle of hinge 19 at a rate of 50,000 measurements per second. As the aircraft 1 makes initial contact with ground 3, it forces telescopic strut 7 to compresses. The rate of vertical movement of cylinder 11 will be different, than the rate of movement of piston 13. The difference in these two rates of movement can be monitored by comparing the measured acceleration of cylinder 11 by attached upper accelerometer 31 as compared to the measured acceleration of piston 13 by attached lower accelerometer 33. Accelerometers 31 and 33 have the ability to measure changes in acceleration at a rate of 50,000 measurements per second. Pressure within strut 7 can be accessed through a "fill port" near the top of the strut and said pressure is measured through that fill-port by a pressure sensor 27. The pressure sensor 27 incorporates an integral temperature sensor (as shown in FIG. 4). Alternatively, a stand-alone pressure sensor can be used in combination with a stand-alone temperature sensor. The accelerometers are used to detect initial touchdown and begin the monitoring of strut pressures and extensions. Pressure within strut 7 can also be accessed through a "drain port" near the bottom of the strut and said pressure is measured through that drain-port by a pressure sensor 29. Pressure sensors 27 and 29 have the ability to measure pressure and temperature changes at a rate of 50,000 measurements per second. Internal strut pressure measured at the initial contact with the ground 3 will increase faster as measured by pressure sensor 29, than that of pressure sensor 27 (and shall be explained in more detail in the description of FIG. 5b). As the aircraft 1 comes into initial contact with the ground 3, aircraft 1 may not be in a horizontal or level position, thus strut 7 will not be vertical. Aircraft hull inclinometer 35 monitors the angle of aircraft 1 in relation to being horizontal. The computer which operates this system uses Software Program Zulu to make airplane 1 hull angle corrections, to adjust for strut 7 not being vertical, as compared to the ground 3.

Referring now to FIG. 3b, there is shown landing gear strut 7 as tire 9 makes initial contact with the ground 3. To maximize the shock absorbing effectiveness of landing gear 7, prior to the initial contact with the ground 3, landing gear 7 must be extended to its maximum telescopic limits. This is commonly referred to as "full extension." To insure piston 13 is at its full extension from within cylinder 11, landing gear strut 7 utilizes a pre-charged amount of compressible gas, typically nitrogen gas. This pre-charge pressure insures that strut 7 is kept at its maximum extension, prior to coming into contact with the ground 3. There are numerous varieties of landing gear designs, each having different shapes and dimensions. As an illustration in this example the pre-charge pressure within strut 7 prior to landing is 182.25 psi. As the tire 9 comes into initial contact with the ground 3 and prior to any compression of the piston 13 within cylinder 11, the pre-charge pressure within strut 7 maintains a pressure of 182.25 psi. With strut 7 postured at full extension the angle created at hinge 19 by upper torque-link arm 15 and lower torque-link arm 17 is herein referred to as Angle "a". In this example Angle "a" maintains a pre-compression measurement of 147.35°. The distance between the opposing ends of torque-link arms 15 and 17 is herein referred to as Dimension "a" with a pre-compression value of 1.41 feet.

Referring now to FIG. 3c, there is shown landing gear strut 7 as it begins to compress and absorb the force of the weight of aircraft 1 as it comes into contact with the ground 3. As strut 7 compressed, pressure within strut 7 as measured by pressure sensor 27 has increased to 239.21 psi. The calculated 1.41 feet of Dimension "a" (FIG. 3b) has now been reduced to the 1.33 feet of Dimension "b". The measured 147.35° of Angle "a" (FIG. 3b) has now been reduced to the 120.28° of Angle "b".

Referring now to FIG. 3d, there is shown landing gear strut 7 as it further compresses. Pressure within strut 7 has increased to 284.42 psi. The calculated 1.34 feet of Dimension "b" (FIG. 3c), has been further reduced to the 1.24 feet of Dimension "c". The measured 120.28° of Angle "b" (FIG. 3c), has now been reduced to the 90.41° of Angle "c".

Boyles Law defining the linear relation between increased gas pressures as compared to reduced volumes is illustrated herein. The compression of strut 7, as shown in this example, occurs within an Elapsed Time of seventy-five hundredths of a second. This extremely short period of time eliminates the need to consider how the compression of the gas and any changes in pressure which might be affected by changes in temperature, as properly defined by Gay Lussac's Law which further expresses the relationship of "pressure-to-volume-to-temperature." Thus there is no need for temperature compensation with this high speed methodology, using such a short period of Elapsed Time, in making the determinations.

The compression of piston 13 within cylinder 11 is also measured by the parallel monitoring of acceleration and changes in acceleration as recorded by upper accelerometer 31, as compared to that of lower accelerometer 33. The difference in these now non-parallel accelerations are used to measure the respective distance for which piston 13 has compressed into cylinder 11; to further determine the reducing values of Dimensions "a, b and c."

Referring now to FIG. 4 there is shown an illustration of a Kulite miniature IS® pressure transducer with integrated temperature sensor, HKL/T-375 (M) series; which is the preferred device for pressure sensor 27 and 29 of this embodiment. This combination pressure and temperature sensor allows for parallel monitoring of both pressure and temperature, within each landing gear strut 7 (shown in FIG. 3*a*). Pressure sensor 27 has a pressure sensing body 28 which is coupled to, and extends inside landing gear 7, making contact with the working pressure and temperature within landing gear strut 7. Multiple pressure sampling ports 30 are located around the perimeter edge of the pressure sensing element 28. Additionally there is a temperature sensing probe 32 located at the end of pressure sensing element 28. Temperature sensing probe 32 remains in constant contact with the internal gas or fluid within landing gear strut 7, allowing for continuous sampling of temperature variations.

Figure 5:
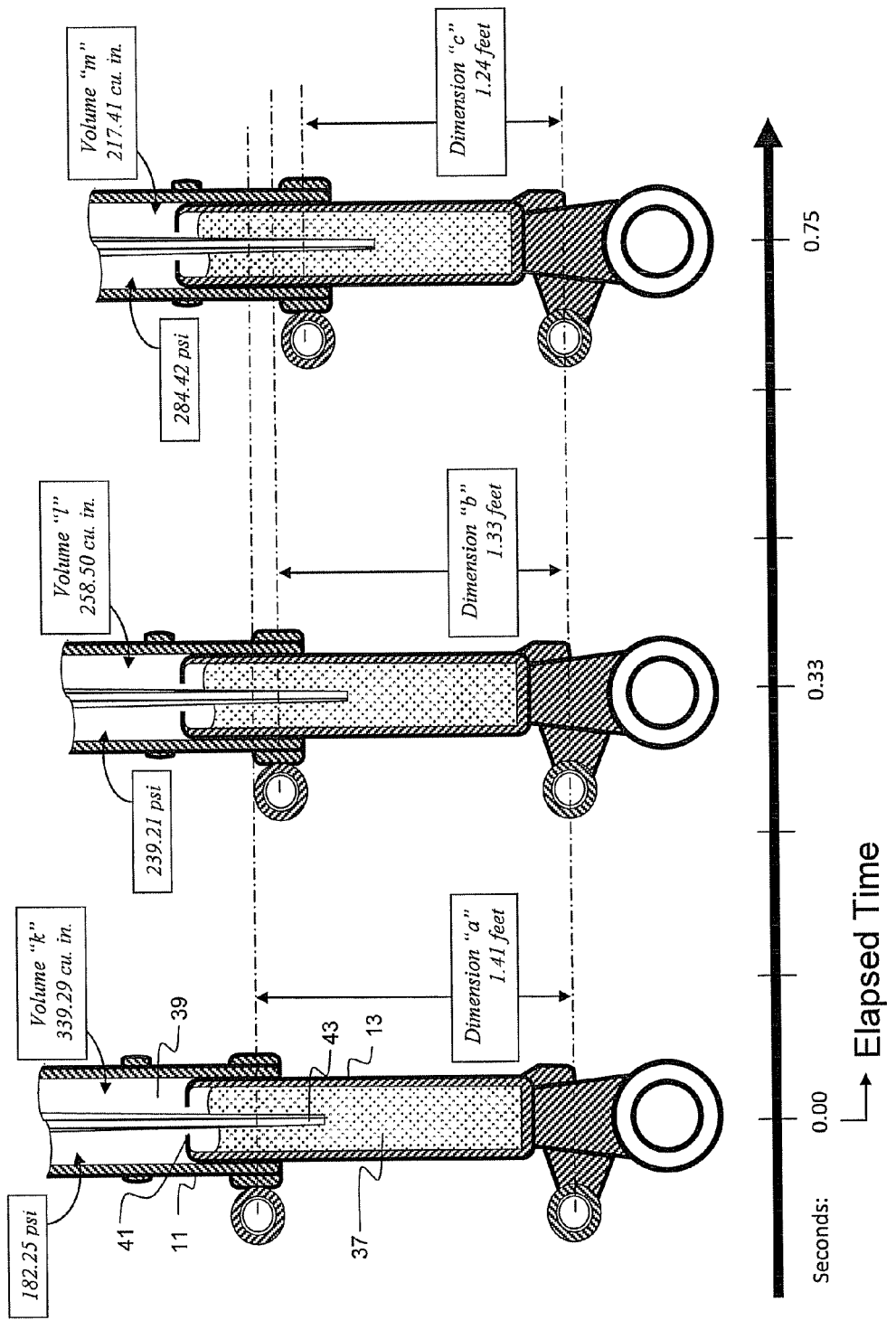

Referring now to FIG. 5*b*, 5*c*, 5*d* there are shown schematic cross-sectional and internal views of the examples illustrated in the previous FIGS. 3*b*, 3*c*, 3*d*.

Landing gear strut cylinder 11, with telescopic piston 13, together contains pressurized fluids, being hydraulic oil 37 and nitrogen gas 39. As piston 13 moves into cylinder 11, nitrogen gas 39 is initially forced through an internal orifice hole 41. As the strut compresses further, the internal strut volume reduces and hydraulic oil 37 is eventually forced through the orifice hole 41. The gas and oil being squeezed through orifice 41 creates resistance and it is this resistance which is used to absorb the force of the aircraft landing event. To further restrict the gas 39 and oil 37 as they passed through the orifice 41, a tapered metering pin 43 moves through orifice 41, and further reduces the area of passage as the fluids transition from the lower piston 13 into the upper cylinder 11. As landing gear strut 7 begins to compress, the restriction in flow created by orifice 41 and metering pin 43 will cause the pressure of the hydraulic oil which is contained below the opening of orifice 41 to be higher than the pressure of the gas 39 which is located above the orifice 41.

When the landing gear strut is at full extension, the total internal gross volume of gas and oil will be the same at all landing events; but the ratio of oil to gas can change due to leakage. It is the volume of compressed gas that is being described in the following examples.

In an example of measuring strut fluid volumes . . . the initial gas 39 pre-charge pressure is 182.25 psi. This pre-charge pressure correlates to a gas 39 volume hereinafter referred to as Volume "k" and in this example is 339.29 cubic inches; which further correlated to Dimension "a" which is 1.41 feet. As shown in FIG. 5*c*, as the strut compresses, the nitrogen gas 39 pressure increases to 239.21 psi. This increased gas 39 pressure within the strut 7 correlates to a reduced volume of the gas to that of Volume "l" being 258.50 cubic inches and directly relates to the reduced value of Dimension "b" being 1.33 feet. As shown in FIG. 5*d* as the strut 7 compresses further, internal strut pressure increases to 284.42 psi, and the volume of gas 39 is further reduced to that of Volume "m" being 217.41 cubic inches and directly relates to the reduced value of Dimension "c" being 1.24 feet. Volumes "k, l and m" are in direct linear proportion to the pressure increases within the strut, as well as directly proportional to the decreasing Dimensions "a, b and c". There are no adjustments needed to pressure or volume values, for changes in temperature, due to the extremely short period of time taken for this example, being within seventy-five hundredths of a second.

Figure 6:
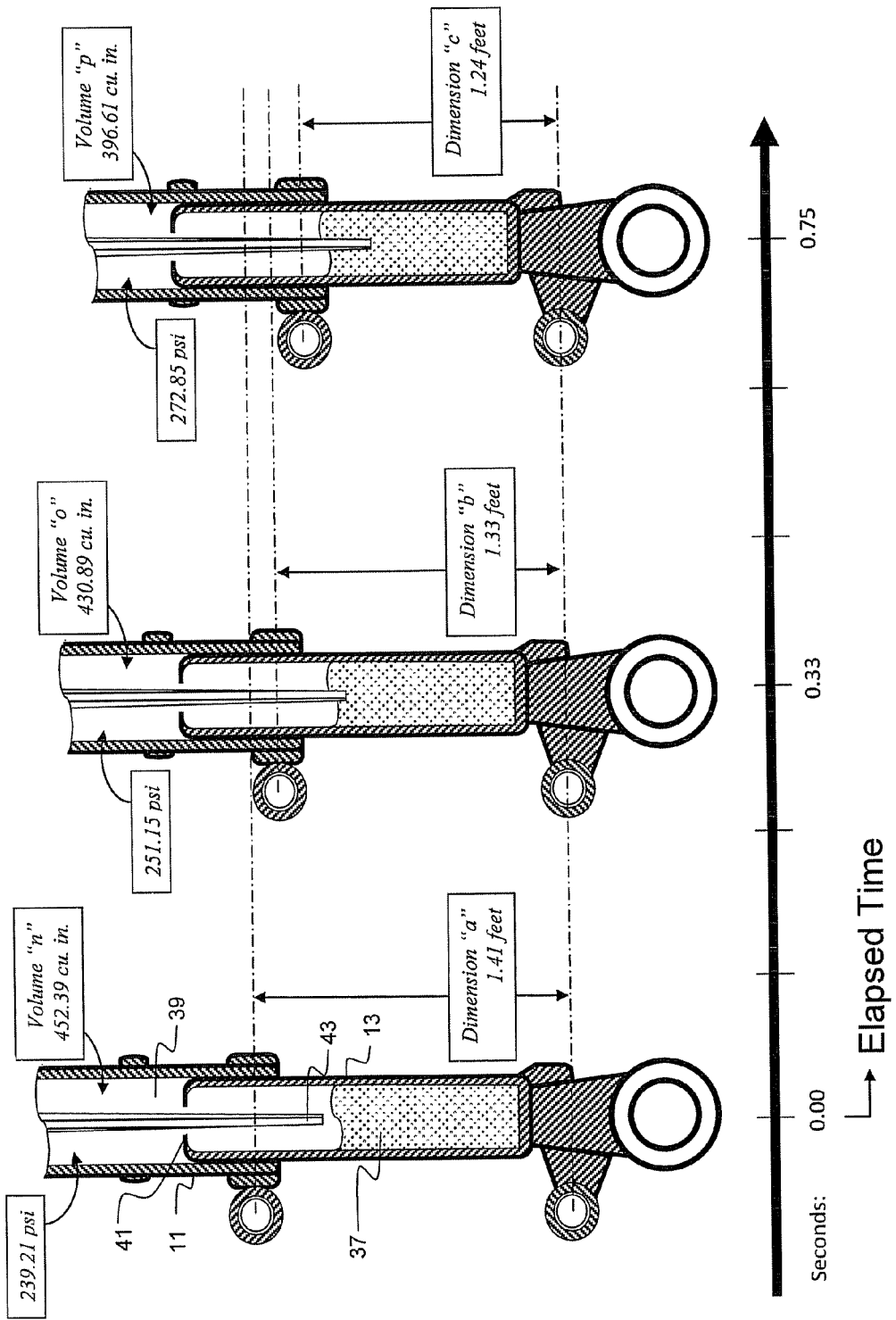

Referring now to FIGS. 6*b*, 6*c*, 6*d* there are shown cross-sectional and an internal view of the examples illustrated in the previous FIGS. 3*b*, 3*c*, 3*d* where there is an excess volume of gas 39. As an example, the reason for the excess volume of nitrogen gas is because the strut was discovered where it appeared approximately two inches low. High pressure nitrogen gas was injected into the strut to increase the strut extension to create the appearance of a properly serviced strut. The strut had in fact lost 56 cubic inches of oil, which over time had escaped through the strut seals. This loss of oil equated to a two inches reduction in strut extension. Compressed nitrogen gas was mistakenly injected into the strut, off-setting and replacing the escaped oil.

In comparing FIGS. 6*b*, 6*c*, 6*d* to that of FIGS. 5*b*, 5*c*, 5*d* . . . the volume of gas 39 is greater in the series of FIGS. 6*b*-6*d*, over that of the series of FIGS. 5*b*-5*d*. A feature in this invention is the recognition that the amount of strut pressure increase over the seventy-five hundredths of a second period is less in a strut that has an excess volume of nitrogen gas than in a strut with a normal volume of nitrogen gas. Even though the internal pre-charge pressure commences at a higher pressure, with an excess amount of nitrogen gas, the increased volume created by that additional compressible gas allows for a reduced rate of increase in pressure, as compared to that of a strut with less compressible gas (see FIG. 7, which is an illustration of Software "Bravo"). Also, the internal strut pressure increases at a slower rate over the same amount of strut collapse. The reason for this slower increase in the combined fluids pressure and lower amount of overall pressure increase is that un-like with the non-compressible hydraulic oil 37, the greater volume of compressible nitrogen gas 39 acts much like a "sponge" or spring. I use the term sponge (for lack of a better word of illustration) in the fact that as the total internal volume reduces the increased pressure is absorbed by the excess amount of nitrogen gas 39. In the day-to-day operations of an airline environment, having the ability to monitor the increases in strut pressure during each landing event, as compared to the Elapsed Time of the initial contact with the ground, allows for a means to determine if the landing gear strut is maintaining the proper ratio of oil and gas, or the ability to determine that the strut has an excess volume of nitrogen gas and needs to be taken to the maintenance department for servicing.

In this example of measuring strut fluid volumes . . . the initial gas 39 pre-charge pressure is 239.21 psi. This pre-charge pressure correlates to a gas 39 volume hereinafter referred to as Volume "n" and in this example is 452.39 cubic inches; which further correlated to Dimension "a" which is 1.41 feet. As shown in FIG. 6*c*, as the strut compresses, the nitrogen gas 39 pressure increases to 251.15 psi. This increased gas 39 pressure within the strut 7 correlates to a reduced volume of the gas to that of Volume "o" being 430.89 cubic inches and directly relates to the reduced value of Dimension "b" being 1.33 feet. As shown in FIG. 6*d* as the strut 7 compresses further, internal strut pressure increases to 272.85 psi, and the volume of gas 39 is further reduced to that of Volume "p" being 396.61 cubic inches and directly relates to the reduced value of Dimension "c" being 1.24 feet. Volumes "k, l and m" are in direct linear proportion to the pressure increases within the strut, as well as directly proportional to the decreasing Dimensions "a, b and c". There are no adjustments needed to pressure or volume values, for changes in temperature, due to the extremely short period of time taken for this example, being within seventy-five hundredths of a second.

Figure 7:
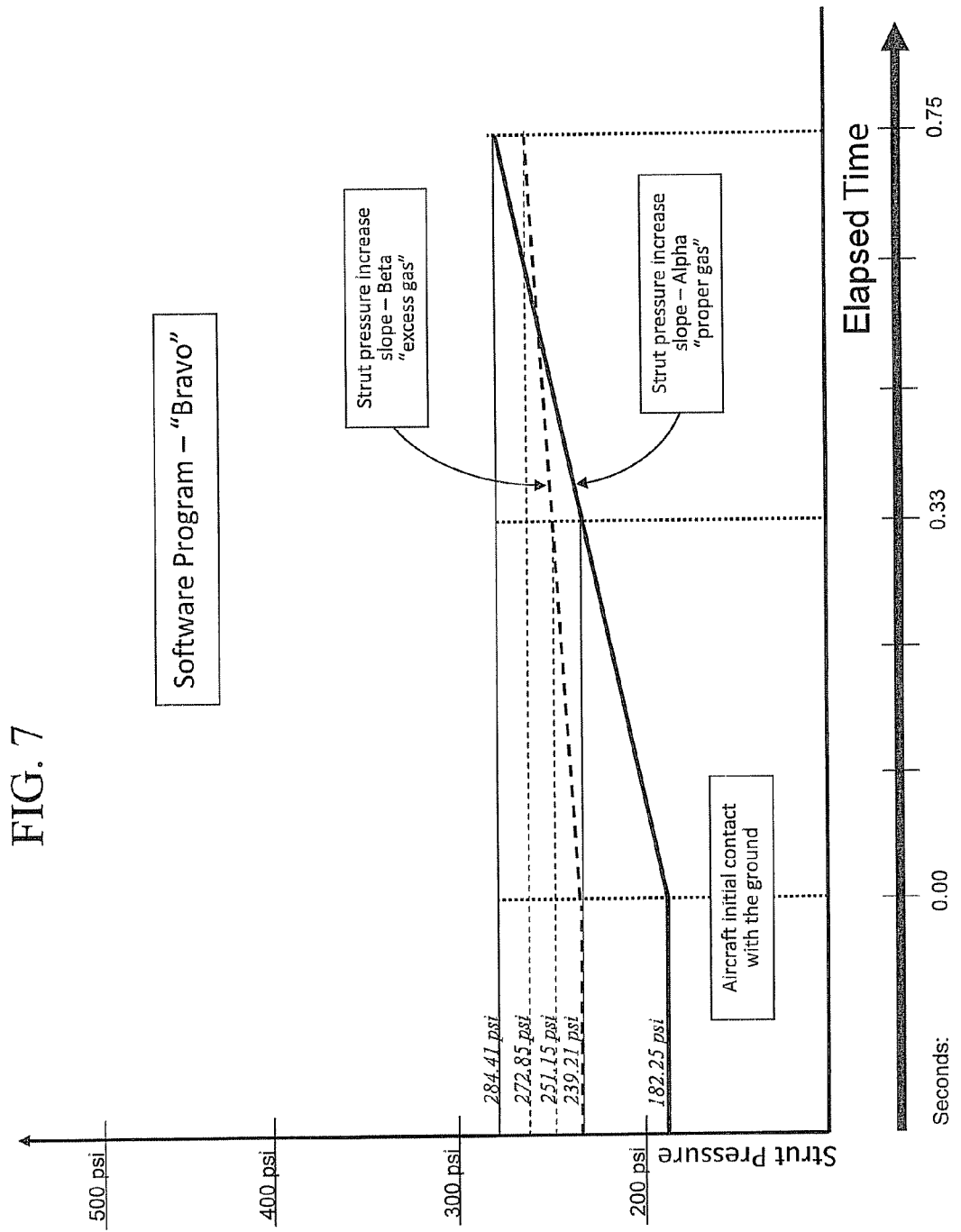
FIG. 7 is an illustration of Software Program "Bravo" which monitors landing gear strut pressure changes, in relation to Elapsed Time, during aircraft landing events, and compares measured data against previously stored data, to detect excess gas within the landing gear strut.

Referring now to FIG. 7 there is shown an illustration of Software Program "Bravo" where landing gear pre-charge pressure is monitored, prior to the aircraft landing, and changes in landing gear strut pressure, measured against Elapsed Time, are recorded and profiled and stored as a look-up table. This FIG. 7 is a graphical view of the illustrations of FIGS. 5b, 5c and 5d as compared to the illustrations of FIGS. 6b, 6c and 6d; and tracks the internal strut pressure values as they change from the compression of the landing gear strut, when comparing a properly serviced landing gear strut to that of a strut which is over-serviced with excess nitrogen gas. A landing gear strut which has been over-serviced with an excess amount of nitrogen gas will have a higher pre-charge pressure than a strut which is properly serviced.

One way to determine if the proper amount of gas to oil is in the strut is to measure the strut pressure before initial touchdown. As shown in FIG. 7, identification of the higher than normal pre-charge pressure is an initial indication of excess nitrogen gas. To provide more accuracy, the pressure measurement can be compensated for the temperature. A threshold can be used to provide an indication of a proper amount of gas in the strut; if the pressure exceeds the threshold, then this is recorded and an indication provided. For example, if the threshold is 200 psi, about 10% over normal pressure, then the pressure is recorded and an indication is provided.

More accurate information can be obtained using the compression of the strut during the landing event. A look-up table which correlates the amount of measured increased pre-charge pressure, to the amount of excess nitrogen gas is developed and stored within the computer memory. The excess amount of compressible gas in a fully extended landing gear strut creates a softer spring in the first second after initial touchdown; therefore as the aircraft makes initial contact with the ground, and the landing gear strut begins its initial compression, the excess volume of nitrogen gas will cause the pressure within the strut to increase slower than that of a properly serviced strut.

Prior to the aircraft coming into initial contact with the ground, landing gear strut 7 (FIG. 3a) has a posture which is commonly referred to as "full extension", where the pre-charge pressure of the nitrogen gas contained within the telescopic strut, forces the strut to extend to its maximum telescopic length. Non-compressible hydraulic oil and compressible nitrogen gas are both contained within the landing gear shock strut. The compressible gas works much like a spring to extend the strut when it is supporting no weight, as well as absorbing aircraft landing energy during the compression of the telescopic strut. As the aircraft comes into initial contact with the ground, the vertical velocity (or sink-speed) of the aircraft will continue past the initial contact with the ground, until such time as pressure within the strut builds-up and creates an opposing force against the aircraft's vertical sink-speed. Thus the initial telescopic extension of the landing gear strut will not change, until such time as internal strut pressure has increased enough to decelerate that sink-rate. The smaller the nitrogen-spring within the strut (e.g. FIGS. 5b-5d), the faster the pressure will increase, as the strut volume reduces. The larger the nitrogen-spring (e.g. FIGS. 6b-6d), the slower the pressure will increase, as the strut volume reduces. This is true even though both of these strut volume reductions were made during the same period of Elapsed Time.

As described in the "Background of the Invention" an illustration of typical events which might cause the improper servicing of an aircraft landing gear strut is often the result of during the pre-flight inspection of the aircraft, the pilot discovers a landing gear strut with a posture which would normally be considered as "low" or near flat. Considering this aircraft inspection occurs just minutes prior to the aircraft being scheduled to depart the airport, a Line Operations Maintenance Technician will be sent to review and remedy the problem. The maintenance technician will most likely inject highly pressurized compressed nitrogen gas into that strut. The injection of the new gas into the strut will not change the pressure within that strut, but merely just increase the amount of volume within that strut, as the strut rises to a posture which would normally be considered as "correct." The airline Line Operations Maintenance Technicians has no means to determine if the additional nitrogen gas now being injected into the strut is replacing nitrogen gas which has previously escaped from the strut, or that volume of new gas being injected into the strut is actually replacing hydraulic oil which has escaped from the strut. Other than a procedure to jack the aircraft up off of the ground, and determine that the additional volume of gas added to the strut has in fact caused a scenario where the pre-charge strut pressure is now higher than what would be found in a properly serviced strut, the only change to the strut is that the telescopic extension has been increased to a point where the strut now appears to be properly serviced. This will result in having a strut without a confirmed determination of the proper amounts of hydraulic oil and nitrogen gas.

After the aircraft has taken off and nears the end of the flight, while the aircraft is preparing to land, no weight is being applied to the landing gear. A strut which is over-serviced with an excess amount of nitrogen gas will have a pre-charge strut pressure which is higher than that of a properly serviced strut. Identification of a higher pre-charge pressure is the initial indication of an excess amount of nitrogen gas within the strut. A means of determining the volume of excess gas contained within an improperly serviced landing gear strut, can be accomplished by measuring strut pressure increases, as compared to reductions in strut internal volume, as compared to Elapsed Time, and using that determined pressure profile and comparing it to a previously recorded and stored pressure profile for a properly serviced landing gear strut.

Describing the graph illustrated within FIG. 7, the vertical arrow on the left side of the page represents increases in internal strut pressure measured in psi. The horizontal arrow along the bottom of the page represents Elapsed Time. Such Elapsed Time is typically experienced within the short time-span of less than a single second of time, as the aircraft makes initial contact with the ground. In this illustration the bold solid line which is graphed and commences with a pressure of 182.25 psi, represents strut pressure profile with a proper sequence and rate of strut pressure increase, for an aircraft landing gear strut compression, with a proper volume of internal compressed nitrogen gas. The bold dashed line which commences with a pressure of 239.21 psi represents strut pressure profile with an improper sequence and rate of strut pressure increase, for an aircraft landing gear strut compression, which has an excess volume of internal compressed nitrogen gas.

The point in time where the aircraft comes into initial contact with the ground is shown as 0.00 seconds along the Elapsed Time arrow.

As the aircraft is descending towards the ground and prior to initial contact with the ground, the properly serviced landing gear strut is deployed from beneath the aircraft at its full telescopic extension, and (in this example) maintains a pre-charge pressure of 182.25 psi. Once the landing gear strut makes initial contact with the ground and after a period of 0.33 seconds of Elapsed Time, the weight and force of the descending aircraft has forced the fully extended landing gear strut to begin its initial compression. The properly serviced strut pressure (in this example the bold solid line) has increased to 239.21 psi. After an additional period of Elapsed Time and at a point of 0.75 seconds, the further compressed properly serviced landing gear strut pressure (in this example the bold solid line) has increased to 284.41 psi.

In continuation of the afore mentioned example illustrated in FIG. 7 the bold dashed line graphed herein represents the pressure increased as compared to Elapsed Time for a strut which has been improperly serviced and contains an excess volume of nitrogen gas.

In the case where the strut is over-serviced with nitrogen gas, the pre-charge pressure will be higher while the strut is at full telescopic extension, and (in this example) maintains a pre-charge pressure of 239.21 psi. Once the landing gear strut makes initial contact with the ground and after a period of 0.33 seconds of Elapsed Time the weight and force of the descending aircraft has forced the fully extended landing gear strut to begin its initial compression. The improperly serviced strut pressure (in this example the bold dashed line) has increased to 251.15 psi. After an additional period of Elapsed Time and at a point of 0.75 seconds, the further compressed improperly serviced landing gear strut pressure (in this example the bold dashed line) has increased to 272.85 psi.

When the landing gear strut is suspended from beneath the aircraft, prior to initial contact with the ground; the total volume within the strut is now a known value. The problem is that the volume is made up of both compressible nitrogen gas and non-compressible hydraulic oil; and the exact respective volumes of either the oil or gas are unknown.

As a further example: immediately after a particular landing gear strut has been properly serviced with the correct amounts of hydraulic oil and nitrogen gas, and on the next scheduled flight, while that strut is suspended from the aircraft prior to landing; this properly serviced strut is deployed beneath the aircraft, while at full telescopic extension has a measured strut pressure (measured by pressure sensor 27 and 29 as shown in FIG. 3a), a known total volume which is established by the strut manufacturer, as well as a known and measured volume of both hydraulic oil and nitrogen gas from just being properly serviced. As this properly serviced strut comes into initial contact with the ground a software program is running within the computer processor for this "System" (FIG. 10) a characterization is made of pressure increases within this strut as compared to Elapsed Time, as compared to reduction in total internal strut volume. This "pressure vs. time vs. volume" profile is recorded and stored as "Strut pressure increase slope—Alpha."

FIG. 7 also illustrates the static determination of strut fluid levels. The temperature-compensated pressure reading taken from the extended strut, before the landing gear touches the ground (before time 0 seconds), is stored in memory. This reading is then compared to a predetermined pressure from a properly serviced strut having the proper amounts of fluids. For example, the pressure reads 239 psi, which is compared to 182 psi from a properly serviced strut. The pressure reading shows that the strut has too much gas and an insufficient amount of oil. How much oil and gas can be determined from using a look-up table. For example, an increase of 100 psi pressure shows that the strut has X liters of oil, which is lower than the normal amount Y. Likewise, the strut has C-X liters of gas, where C is the total volume of the fully extended strut. At the next opportunity for service, ground personnel takes the strut pressure, bleeds off gas, adds Y-X liters of oil and adds gas back to the strut to reach the same strut pressure as before the procedure.

In continuation of this example, this same landing gear strut, after weeks and weeks of multiple daily departures and landings, and several instances where pilot pre-flight inspections reveal the strut as low; and Line Operations Maintenance Technicians have had an opportunity to inspect and re-service the strut, this strut has reached a point where the strut is now improperly serviced and has an excess amount of nitrogen gas. During a subsequent landing event this improperly serviced strut, at full extension has a measured strut pressure (measured by pressure sensor 27 and 29 as shown in FIG. 3a), a known total volume due to the fact the strut is at full extension, but unknown volumes of both hydraulic oil and nitrogen gas. As this subsequent landing event proceeds and the apparatus of this inventions monitors the changes in strut geometry to determine changes in strut internal volume, as well as measures pressure increases as related to Elapsed Time; as the aircraft lands and the strut compresses, a strut pressure increase slope—Beta is measured and characterized. The comparison of pressure slope-Alpha to that of pressure slope-Beta, through a mathematical algorithm allows for the determination of the amount of excess nitrogen gas which has been introduced to the strut, to further allow for the determination of the amount of hydraulic oil which has escaped.

But this conclusion could be flawed, in the fact that the pre-charge pressure of an aircraft landing gear strut can change due to variances in the temperature of that strut. The temperature of a strut can change rapidly from an extreme cold-soaked condition, where the aircraft has been flying at altitude with sub-zero conditions for many hours, to being on final approach for landing, where the landing gear are deployed from beneath the aircraft and a 200 mph wind at much higher temperatures will quickly change the strut temperature. Thus the use of a temperature compensated pressure sensor will allow for adjustment to correct pressure determinations.

In addition to this example, consider the comparison of two main landing gears on the same aircraft, as that aircraft lands. The strut with the proper servicing levels will have a strut pressure increase slope-Alpha. The strut with an excess in compressible nitrogen gas will have a pressure to Elapsed Time profile which is different. The different slope profile of pressure slope-Alpha as compared to that of Slope-Beta is a steeper slope, revealing a lesser amount of nitrogen gas, whereas a more shallow slope (as in the case of Slope-Beta) would reveal a greater amount of nitrogen gas.

The excess nitrogen gas will cause the internal strut pressure to increase at a slower rate, thus detecting the excess volume of gas. Depending on the size and type of landing gear strut a mathematical algorithm is created which measures the rate at which the pressure increases, to determine the volume of gas contained within that respective strut. The value of the lower volume of gas within a properly serviced strut is subtracted from the determined value of the excess volume of gas within an over-serviced strut; will allow for the calculation of the amount of excess gas. Once the amount of excess gas is determined, algorithms are created to extrapolate these determinations to values for the amount of hydraulic oil which has escaped from the strut.

Figure 8:
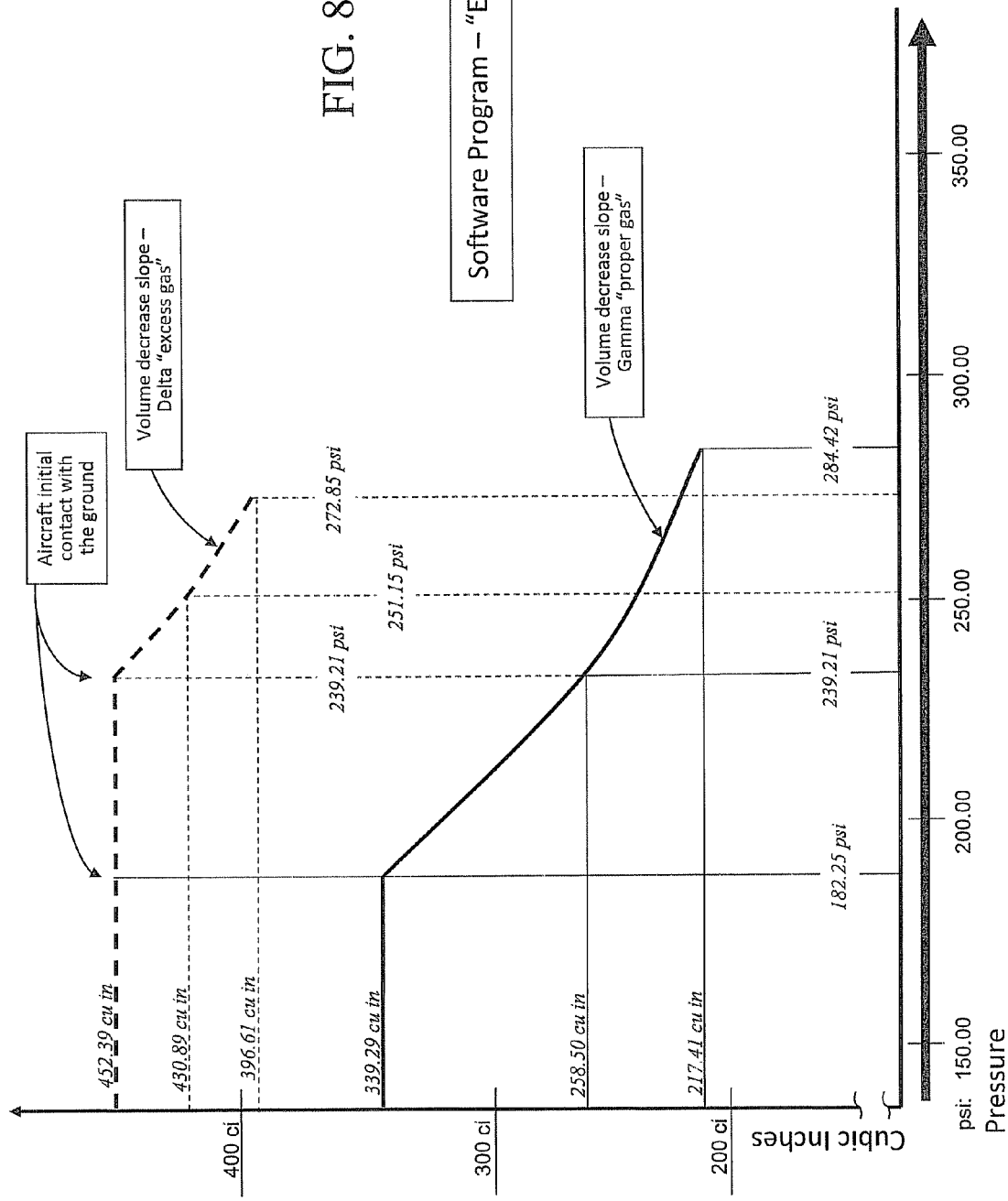
FIG. 8 is an illustration of Software Program "Echo" which monitors landing gear strut volume changes, in relation to pressure changes, during aircraft landing events, and compares measured data against previously stored data, to detect excess gas within the landing gear strut.

Referring now to FIG. 8 there is shown an illustration of Software Program "Echo" where recognition of a higher strut pre-charge pressure is used to determine the increased amount of excess gas contained within the strut. Program "Echo" uses strut volume. The determination of strut volume is made by knowing the diameter of the strut piston 13 and the strut extension. Strut extension can be measured by the rotation sensor 25 and knowing the length of the arms 15, 17 (see FIG. 3a). By monitoring of strut pre-charge pressure before landing, allows for the identification that the struts predicted 182.25 psi has not been identified as the current strut pressure, but instead a pressure is measured at 239.21 psi. This higher pre-charge pressure (once corrected for distortions from the extreme cold-soaked temperatures of the aircraft flying in sub-zero temperatures) allows the system computer to determine that there is an additional 113.10 cubic inches of excess nitrogen gas within the landing gear strut. This conclusion is achieved by the subtraction of the 339.29 cubic inches (as what should have been the proper volume) from the 452.39 cubic inches (as determined by the higher pre-charge pressure). As the aircraft initiates the landing event, additional determinations are made and confirmed as the strut pressure increases, by the weight of the aircraft being transferred to the landing gear struts. Pre-determined and memory-stored pressure increase profile "Echo" is one of numerous look-up tables stored within the memory of the computer to allow for the determinations of the amounts of excess gas volumes which may exist. The various look-up tables have slightly different slopes, which have been pre-validated against numerous tests of struts with various amounts of excess gas volumes.

Again Boyle's Law is considered in this illustration. If the entire volume within the telescopic landing gear strut were to be filled totally with compressible nitrogen gas; then there would be a direct relationship between the gas pressure and any reduction in total volume. With the telescopic strut volume "partially filled" with non-compressible hydraulic oil, Boyle's Law only prevails on that portion of internal volume containing the compressible gas. Thus when there is excess gas volume in the strut, the pre-charge pressure within the fully extended strut is higher than that of a strut which has a proper amount of gas. This will cause a shift in the strut pressure profile, as what would be anticipated, when compared to the pressure of a properly service landing gear strut.

As an example of a situation in which a higher "pre-charge pressure" could be caused; consider again where the airline Line Maintenance Technician discovers a strut that appears low. The aircraft is resting on the ground with the full weight of the aircraft supported by the nitrogen gas pressure within the landing gear struts. Considering the fact that the landing gear strut is telescopic, the escape of either nitrogen gas, or hydraulic oil will have no effect on the "measured pressure" within the landing gear strut, as that measured pressure relates to the weight of the aircraft it is supporting. The loss of either oil or gas will not change the "strut pressure", but will only change "strut posture", since that pressure is a function of weight (as pounds—p) multiplied times the horizontal cross-sectional area (as square inches—si) of the strut resulting is a pressure measured in "psi", being the pressure as it relates to actual weight supported. Whether there is excess gas, or lost gas . . . excess oil, or lost oil; the static pressure within the strut will be the same, only the internal volume of the strut will change, thus causing a change in telescopic extension of the strut. It is for this reason that the Line Maintenance Technician has no measurable means of indication as to whether the "low" landing gear strut is in need of oil or is need of gas.

As opposed to the relatively low pre-charge pressure of 182.25 psi, experienced when there is no weight on the strut; the pressure within the strut (when the aircraft is resting on the ground) can be in the range of 2,300 psi. If hydraulic oil has escaped from the strut, in an amount that would reduce the strut posture a total of two inches while bearing the weight of the aircraft; then the amount of high pressure nitrogen gas needed to increase the internal volume within that strut to allow strut extension to increase by the 2 inches, would cause the "non-weight bearing" pre-charge pressure of that strut to be much higher.

For example, in this FIG. 8 the excess nitrogen gas within the over-serviced strut increases to the now measured pre-landing, pre-charge strut pressure from what would be the expected 182.25 psi to a now identified and measured 239.21 psi.

As further illustrated herein, within a properly serviced telescopic strut, the expected pressure profile slope is shown as the bold solid line which extends from left to right as compared to changing (as in this and in most cases be reducing) volume as measured in cubic inches.

Considering the properly serviced landing gear strut and in this example is illustrated by the bold solid line; prior to the aircraft's initial contact with the ground the landing gear strut maintain full extension with a pre-charge pressure of 182.25 psi and a total volume of oil and gas of 339.29 cubic inches. Once the aircraft has made initial contact with the ground and as the strut begins to compress, the internal gas volume will have decreased to 258.50 cubic inches, and the initial pre-charge pressure within the strut will have increased to a higher pressure of 239.21 psi. As the strut continues to compress the gas volume will have again decreased to 217.41 cubic inches, and the internal strut pressure will increase to 284.42 psi. This pressure to volume profile slope "Gamma" is stored within a look-up table, within the computer memory of this system.

In further consideration within this example: an improperly serviced landing gear strut is illustrated by the bold dashed line. Prior to the aircraft's initial contact with the ground the landing gear strut maintains full extension with a pre-charge pressure of 239.21 psi and a total volume of oil and gas of 452.39 cubic inches. Once the aircraft with an improperly serviced strut has made initial contact with the ground and as the strut begins to compress, the total strut internal volume will decrease along the same slope of volume reductions as with a properly serviced landing gear strut, but at a slightly higher pressure range. The reason for this is that at the initial compression of the landing gear strut, from its pre-charge full extension; the internal pressures are relatively low. With the heavy mass of a fully loaded aircraft, and the pilot of that aircraft following a defined landing glide-slope flight-path, the aircraft is maintaining a uniform sink-speed. As the aircraft comes into initial contact with the ground the very low amount of pre-charge pressure within the landing gear strut is not sufficient to reduce the aircraft's vertical sink-speed, within the initial 75/100ths of a second; to a sink-speed that would change the rate of volume reduction in the landing gear strut. Therefore the collapse rate of a properly serviced strut will be the same as an improperly services strut, during that initial 75/100ths of a second of the initial contact point of the landing event. It is only later in the landing event that enough pressure has built up within the strut to reduce the aircraft's vertical sink-speed, which will further reduce the sink-speed through the remainder of the landing event.

In continuation: regarding the improperly serviced landing gear strut which in this example is illustrated by the bold dashed line, prior to the aircraft's initial contact with the ground the landing gear strut maintain full extension with a pre-charge pressure of 239.21 psi and a total volume of oil and gas of 452.39 cubic inches. Once the aircraft has made initial contact with the ground and as the strut begins to compress, the internal gas volume will have decreased to 430.89 cubic inches, and the initial pre-charge pressure within the strut will have increased to a higher pressure of 251.15 psi. As the strut continues to compress the gas volume will have again decreased to 396.61 cubic inches, and the internal strut pressure will increase to 272.85 psi. A mathematical algorithm which is particular to the dimensions of a particular type aircraft landing gear strut is used as a means to identify the precise values of oil and gas. This pressure to volume profile slope "Delta" is stored within a look-up table, within the computer memory of this system.

Referring now to FIG. 8a there is shown an illustration of Software Program "Kilo". Landing gear strut pre-charge pressure is monitored prior to the aircraft landing and initial contact of the landing gear with the ground, as well as shortly after the landing gear initially contacts the ground and the aircraft begins to settle on, or apply weight to, the landing gear. Strut pressure changes are recorded and profiled as a pressure increase trajectory, and stored within a look-up table. When the landing gear is properly serviced, in this example: having a pre-charge pressure of 182 psi, the compressible gas will fill the known internal volume of the fully extended strut. When the landing gear strut has lost some amount of compressible gas, and while the strut remains at its full telescopic limits, the gas will always expand to fill the limits of the internal volume, but will have a lesser pressure value. This lesser internal strut pressure value will create a lesser spring strength/resistance as the landing gear makes initial contact with the ground. The lesser spring resistance will allow the strut to compress easier, by having less pressure working against the struts telescopic compression. The rate at which the lesser spring pressure increases as compared to the volume change within the strut as the strut telescopically compresses is recorded and associated with the amount of reduced gas volume within the strut.

FIG. 8a illustrates the internal strut pressure values as they change during the compression of the landing gear strut, when comparing a properly serviced landing gear strut to that of a strut which has lost nitrogen gas. A landing gear strut which has lost nitrogen gas will have a lower pre-charge pressure than a strut which is properly serviced. Identification of a lower than proper pre-charge pressure is an initial indication of lost nitrogen gas. Nitrogen gas volume information can be determined during the compression of the strut during the landing event. A look-up table which correlates the amount of the lower pre-charge pressure, to the amount of nitrogen gas present is developed and stored within the computer memory.

As an example, a strut which is serviced with proper amounts of oil and gas will consistently maintain a pre-charge pressure of 182 psi. As the strut compresses and internal strut volume is reduced, strut pressure will increase along a predetermined pressure increase trajectory, and is illustrated by slope "Zeta". A lower pre-charge pressure contained within the same volume of the fully extended strut will indicate a loss of either nitrogen gas or strut oil. Aircraft landing gear struts will typically lose gas 8-10 times faster than the strut will lose oil; thus when a lower pre-charge pressure is discovered an initial assumption may be made that the strut has lost some amount of gas. In this example, the identification of a lower pre-charge pressure of 162 psi will identify the strut has lost 10% of the proper gas volume, and as shown by slope "Theta". Slope "Theta" will follow a prescribed and repeatable trajectory of pressure increase as the volume within the strut reduces through telescopic compression.

The identification of an even lower pre-charge pressure of 142 psi will identify the strut has lost 20% of the proper gas volume, as shown in slope "Sigma". Slope "Sigma" will follow a prescribed and repeatable trajectory of pressure increase as the volume within the strut reduces through telescopic compression.

The identification of an even lower pre-charge pressure of 122 psi will identify the strut has lost 30% of the proper gas volume, as shown in slope "Kappa". Slope "Kappa" will follow a prescribed and repeatable trajectory of pressure increases as the internal volume within the strut is reduced through telescopic compression.

The question then arises whether the lower pre-charge pressure determinations are associated with just lost gas, or whether both compressible nitrogen gas and non-compressible oil have been lost. To determine the amount of lost gas as compared to the amount of lost oil, the trajectory of pressure increases from the pre-charge pressure of 122 psi will change due to variations in the ratio of compressible to non-compressible fluids lost from within the measured volume of the strut. Slope "Kappa-Phi" has a higher trajectory for pressure increase than slope "Kappa". The higher trajectory of slope "Kappa-Phi" is caused by the 25% lower volume of gas combined with the 5% lower volume of oil. With 25% of the gas missing instead of the 30% missing with slope "Kappa", the spring strength of the gas is slightly higher, thus creating more resistance to strut compression, thus the higher pressure increase trajectory, which is initiated from the same 122 psi pre-charge pressure of the fully extended strut.

Slope "Kappa-Chi" has an even higher trajectory for pressure increase than slope "Kappa-Phi". The trajectory of slope "Kappa-Chi", starting from the same 122 psi pre-charge pressure is caused by the 20% lower volume of gas combined with the 10% lower volume of oil. The change in trajectory related to lost oil illustrated for slopes "Kappa-Phi and Kappa-Chi" can be applied to slopes "Sigma, Theta, Zeta" based on verification and repeatability of proper trajectory variations, through on-aircraft demonstration or landing gear drop-test stand validation. For clarification, a pressure increase trajectory that relates to a strut that has lost gas only, with no oil loss, is referred to as a "proper trajectory", and a pressure increase trajectory that relates to a strut that has lost both gas and oil is referred to as a "higher trajectory".

The step of identification of a lower pre-charge pressure is the first step in determining the amount of gas which has been lost from the strut; but the additional step of verifying a proper trajectory of strut pressure increase as the strut volume is reduced, from the measured pre-charge pressure, is required to verify if the lower pre-charge pressure is directly related to lost gas, with no lost oil. The amount of reduced pre-charge pressure, from that of the pre-charge pressure of a properly serviced strut is determined and is directly proportional to the amount of gas that has leaked from the strut. Calculations are made and the determined amount of gas that has leaked from the strut is then subtracted from the known amount of gas within a properly serviced strut, to determine the amount of gas remaining in the strut. Identification of a higher trajectory to that of the proper trajectory, from the measured pre-charge pressure, will identify that the strut has lost some combination of lost oil and gas. The higher trajectory identifies that the lower pre-charge pressure is not related to loss of gas alone, but some amount of non-compressible oil has been lost. Monitoring strut pressure through multiple landing events, where the angle of higher trajectory is identified progressively higher with each landing event, confirms subsequently higher volumes of oil being lost. A look-up table is created which correlates the respective higher pressure increase trajectories, to the increased amounts of oil which is lost. Another look-up table is created which relates the variations of respective slopes of higher trajectories to the respective amounts of lost gas and lost oil. When an identified lower pre-charge pressure is followed by a higher trajectory than the proper trajectory of for gas loss alone, reference to the look-up table is made to determine the amount of oil lost as compared to the amount of gas which has been lost, to further calculate the amount of gas that remains within the strut.

Referring now to FIG. 9b, there is shown an example of an "alternate design" for main landing gear 7 which utilizes a trailing arm 21. Trailing arm 21 extends aft from the bottom of main landing gear 7. This design allows landing gear 7 and trailing arm 21 to act in a similar manner as to the tongue-link described in FIG. 3, which prevents rotation of the telescopic shock absorber mechanism of piston 13 compressing within cylinder 11. The elements of this alternate design for main landing gear 7 form the three sides a triangle where the telescopic action of piston 13 within cylinder 11 creates a variable side to the triangle. The variable length of the telescopic action of piston 13 within cylinder 11 is directly proportional to the opposing angle created by the trailing arm hinge 23 (Side-Angle-Side Postulate of Geometry, identifying the relationship between corresponding sides and angles). The changing value of this interior angle is herein shown as Angle "x". The changing length of the telescopic mechanism of piston 13 and cylinder 11 relates to and is herein shown as Dimension "x". Rotation sensor 25 measures the rotary movement of tailing arm hinge 23, thus measuring the rotating movement of trailing arm 21, in relation to that of the body of landing gear 7, to create Angle "x". In this example Angle "x" is shown with a value of 153.75 psi. There are various aircraft types which use this alternate design with trailing arm configuration, where their dimensions will be different than those illustrated herein. Therefore the values expressed in this example are used merely to illustrate the geometric and mathematical principles applied and used in this invention. The body of landing gear 7 is a fixed length and will not change. The length of trailing arm 21 is a fixed length as well and will not change.

The changing value of Angle "x" to that of Angle "y" (as shown in FIG. 9c) and changed further to Angle "z" (as shown if FIG. 9d); are used to calculate the changing value of Dimension "x" to that of Dimension "y", and to change further to Dimension "z".

The reduction in value of Dimension "x" to that of Dimension "y" (as shown in FIG. 9c), and reduced further to Dimension "z" (as shown in FIG. 9d), as compared to increased pressure measurements recorded by upper pressure sensor 27 and lower pressure sensor 29; as further compared to the passing of Elapsed Time; are used to measure the volume of nitrogen gas contained within the telescopic shock absorber mechanism of piston 13 compressing within cylinder 11.

The transition of Dimension "x" to that of Dimension "y" and further to that of Dimension "z" are calculated by the differential data streams as recorded from upper accelerometer 31, to that of lower accelerometer 33 (as previously described in FIG. 3a).

As the strut pressures are measured, these pressures are stored to build a strut history which in turn can be used to build a look-up table of relative amounts of oil and gas with respect to pressures. As more information is stored and accumulated, the measurements gain in precision. For example, using the dynamic method of strut measurement the strut history can be built. Once the history is built of created, then the static temperature-compensated pressure measurements can be used more reliably.

Referring now to FIG. 10, there is shown there is shown a block diagram illustrating the apparatus of the invention, where multiple (nose, left-main and right-main landing gear) upper pressure sensors 27 and lower pressure sensors 29, and; are sources of data input into computer 25. Aircraft hull inclinometer 35 also inputs into computer 25. Computer 25 receives power from the aircraft power sources. Computer 25 is equipped with an internal clock and calendar to document the time and date of stored data. Computer 25 has multiple software packages which include:

Software Program Alpha—a software routine for monitoring aircraft landing strut pressure increases, as related to Elapsed Time, to determine a rate of pressure increase slope which characterizes the typical rate of pressure increase experienced during an aircraft landing event, for a landing gear strut which is properly serviced with correct volumes of both hydraulic oil and compressed nitrogen gas.

Software Program Beta—a software routine for monitoring aircraft landing strut pressure increases, as related to Elapsed Time, to determine a rate of pressure increase slope which characterizes the typical rate of pressure increase experienced during an aircraft landing event, for a landing gear strut which is improperly serviced and having an excess volume of compressed nitrogen gas; which is used in comparison to software program Alpha to determine the amount of excess gas within the strut.

Software Program Gamma—a software routine for monitoring aircraft landing strut pressure increases, as related to reductions in the volume of compress gas, to provide a pressure increase slope which characterizes the amount of excess gas contained within the landing gear strut Software Program Delta—a software routine for monitoring aircraft landing strut pressure increases, as related to reductions in the volume of compress gas, to provide a pressure increase slope which identifies the amount of excess gas contained within the landing gear strut, through the measurement and determination of a higher pre-charge pressure.

Software Program Epsilon—Aircraft Approach Angle Compensation, which uses inclinometer data to correct for non-level aircraft postures.

Software Program Bravo—a software routine which compares software programs Alpha and Beta, in the determination of a different rate of strut pressure increase, during the first second of a landing event; to determine excess compress gas with a landing gear strut.

Software Program Echo—a software routine which compares software programs Gamma and Delta, in the identification of a higher pre-charge pressure within a landing gear strut, and further determines the amount of excess compress gas within a landing gear strut.

Software Program Kilo—a software routine which identifies a lower strut pre-charge pressure to further identify a strut which has lost some volume of oil or gas. Also, to further compare strut pressure increases as compared to strut volume decreases as the strut compresses during each landing event, to determine the volume of compress gas within a landing gear strut.

Software Program Papa—a software routine which recognizes strut pressure changes in relation to the rate of pressure changes, which are corrected for variations in temperature, and are associated in further relation to measured changes in the internal strut volume as the telescopic landing gear compresses as measured with rotation sensor monitoring angle changes of the landing gear, and are associated in further relation to the measure vertical deceleration of the aircraft as measured by accelerometers attached to the aircraft; which are all subsequently used to determine changes in volume of compressible fluid (gas) within the telescopic landing gear strut. Software Program Papa utilizes multiple, cross-referenced look-up tables which are created with pressure, temperature and rotation sensor measurements, along with measured aircraft decelerations, recorded during multiple aircraft landing events or alternately measured and recorded through the use of a landing gear drop-test stand to simulate actual landing events (see for example FIG. 2c). While the aircraft is flying, the landing gear strut remains at its full telescopic limits, which is a repeatable and known amount of internal strut volume. An initial look-up table is generated comparing monitored pressure and volume changes where a properly serviced landing gear strut with a correct volume of compressible gas and a correct volume of non-compressible oil, which are measured as the landing gear compresses. The non-compressible oil contained within the landing gear will act like a "solid plug" through the initial compression phase of the landing gear strut. To further identify if the lesser pre-charge pressure is caused by the loss of compressible gas, or the leakage of non-compressible oil, multiple calibration events are executed and repeated, to assure that in service repeatability, with various amount of reduced oil volume and reduced amounts of gas volume, and to create an additional depth to the look-up tables. An additional look-up table is generated to monitor aircraft deceleration rates as the landing gear strut compresses, at the various reduced volumes of oil and gas, to further refine look-up tables and systems ability to accurately measure and monitor the gas volume within the strut. As the aircraft is landing the aircraft hull acceleration/deceleration is measured and compared to the rate of pressure increase and rate of strut compression, for a strut with proper volume of gas.

Typical prior art airline maintenance procedures have maintenance personnel use a portable pressure gauge and measured scale-ruler to compare landing gear strut pressure to landing gear strut extension, while the weight of the aircraft rest upon the landing gear. Within the landing gear compartment is a placard that uses a chart to identify a strut pressure range which is acceptable to the amount of current telescopic extension. If the measured strut pressure does not align with the current measured strut extension (as shown by a curve on the chart) the probability is great that the gas volume is incorrect. The chart has a substantial band range of pressure vs. strut extension and can only illustrate as a range of possible gas or oil mis-service and not precisely determine the volume of gas which may have leaked from the strut. The rotation sensor of this invention will replace and thus automate the use of a hand-held ruler. The pressure sensor of this invention will replace and thus automate the use of the portable pressure gauge. Automating the manual comparison of strut pressure to strut extension, while the aircraft is on the ground and load applied to the struts, while compared to the other look-up tables, allows for an additional cross-reference feature in the identification of a strut that has an insufficient volume of compressible gas.

Software Program Zulu—a software routine which makes airplane hull angle corrections, to adjust for the strut not being vertical, as compared to the ground.

The identification of an over-gassed strut is provided to maintenance personnel who can properly service the strut by bleeding off excess gas and providing additional oil. The amount of oil required by the strut is determined and provided to maintenance personnel.

Although the present invention has been described measuring embodiments attached to telescopic elements, of fluid type aircraft landing gear struts, the invention could also apply to other types of industrial telescopic devices.

Although strut extension has been discussed in conjunction with landing of aircraft, strut extension can also occur when the aircraft takes off. For example, FIGS. 3a-3d operate in reverse, albeit with different elapsed times.

Although an exemplary embodiment of the invention has been disclosed and discussed, it will be understood that other applications of the invention are possible and that the embodiment disclosed may be subject to various changes, modifications, and substitutions without necessarily departing from the spirit and scope of the invention.

The invention claimed is:

1. A method of monitoring internal fluid levels in a landing gear on an aircraft, the landing gear comprising a telescopic strut, the internal fluids comprising a compressible fluid and a non-compressible fluid, which telescopic strut is capable of extension, comprising the steps of:
   a) allowing the strut to fully extend under no load while the aircraft is in flight;
   b) determining a temperature-compensated pressure of the fluids in the strut while the strut is fully extended under no load;
   c) comparing the no load temperature-compensated pressure of the fluids in the strut, to a predetermined pressure of a properly serviced strut;
   d) monitoring the temperature-compensated pressure of the strut over elapsed time after the landing gear makes contact with the ground; and
   e) if the no load pressure is below the predetermined pressure, determining from the temperature-compensated pressure of the strut over elapsed time after the landing gear makes contact with the ground the amount of compressible fluid in the strut.

2. The method of claim 1, further comprising the steps of:
   a) providing a look up table of pressures and corresponding ratio amounts of compressible fluid in the strut; and
   b) the step of determining from the pressure the respective amounts of compressible fluid in the strut further comprising the step of using the look up table.

3. The method of claim 1, wherein the step of allowing the strut to fully extend under no load further comprises the step of allowing the strut to extend after takeoff of the aircraft from the ground.

4. The method of claim 1, wherein the step of allowing the strut to fully extend under no load further comprises the step of allowing the strut to extend before landing the aircraft on the ground.

5. The method of claim 1, wherein the compressible fluid comprises nitrogen gas and the non-compressible fluid comprises oil.

6. The method of claim 1, wherein the step of determining from the pressure the respective amounts of compressible and non-compressible fluids in the strut further comprises the step of comparing the initial pre-charge pressure to a predetermined pressure increase trajectory.

7. The method of claim 1, further comprising the step of recording the amount of compressible fluid in the strut.

8. A method of monitoring internal fluid levels in a landing gear on an aircraft, the landing gear comprising a telescopic strut, the internal fluids comprising a compressible fluid and an non-compressible fluid, which telescopic strut is capable of extension, comprising the steps of:
- a) exercising the strut while the aircraft is transporting passengers or cargo;
- b) while the strut is exercised, allowing the strut to compress;
- c) determining a temperature-compensated pressure of the fluids in the strut over elapsed time; and
- d) determining from the temperature-compensated pressure the respective amounts of compressible fluid in the strut.

9. The method of claim 8, wherein the step of determining from the pressure the amount of compressible fluid in the strut further comprises the step of determining the amounts of compressible and non-compressible fluid from the rate of change in pressure over elapsed time.

10. The method of claim 8, wherein the step of exercising the strut while the aircraft is transporting passengers or cargo further comprises the step of exercising the strut while the aircraft is landing.

11. The method of claim 8, further comprising the step of recording the respective amount of compressible fluid in the strut.

\* \* \* \* \*